US009813952B2

United States Patent
Choi et al.

(10) Patent No.: US 9,813,952 B2
(45) Date of Patent: Nov. 7, 2017

(54) METHOD FOR TRANSMITTING DOWNLINK SIGNAL OF USER EQUIPMENT HAVING DUAL CONNECTIVITY IN HETEROGENEOUS CELL ENVIRONMENT

(71) Applicant: LG ELECTRONICS INC., Seoul (KR)

(72) Inventors: Hyeyoung Choi, Seoul (KR); Jaehoon Chung, Seoul (KR); Ilmu Byun, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/776,515

(22) PCT Filed: Apr. 7, 2014

(86) PCT No.: PCT/KR2014/002984
§ 371 (c)(1),
(2) Date: Sep. 14, 2015

(87) PCT Pub. No.: WO2014/163450
PCT Pub. Date: Oct. 9, 2014

(65) Prior Publication Data
US 2016/0044548 A1 Feb. 11, 2016

Related U.S. Application Data

(60) Provisional application No. 61/808,638, filed on Apr. 5, 2013, provisional application No. 61/815,229, filed
(Continued)

(51) Int. Cl.
*H04W 36/00* (2009.01)
*H04W 36/04* (2009.01)
(Continued)

(52) U.S. Cl.
CPC ....... *H04W 36/0061* (2013.01); *H04W 36/04* (2013.01); *H04W 36/02* (2013.01);
(Continued)

(58) Field of Classification Search
CPC ......... H04W 36/0061; H04W 36/0011; H04W 36/0027; H04W 36/04; H04W 36/02;
(Continued)

(56) References Cited

U.S. PATENT DOCUMENTS

| 8,934,902 B2 * | 1/2015 | Chen ..................... H04W 36/30 |
| | | 455/436 |
| 2011/0206011 A1 * | 8/2011 | Ishida ................... H04W 36/04 |
| | | 370/331 |

(Continued)

FOREIGN PATENT DOCUMENTS

| CN | WO2010/145238 | * 12/2010 | ............. H04L 12/56 |
| WO | WO 2013/020292 A1 | 2/2013 | |

(Continued)

OTHER PUBLICATIONS

3GPP TS EUTRAN X2 Application Protocol Release 8 (36.423 V8.2.0), May 2008, p. 13.*

*Primary Examiner* — Warner Wong
(74) *Attorney, Agent, or Firm* — Birch, Stewart, Kolasch & Birch, LLP

(57) ABSTRACT

Disclosed are a transmission method and a base station comprising: user equipment confirming a handover to be performed; transmitting to a macro cell a data forwarding request message for requesting forwarding of downlink data of a small cell to the user equipment, when the user equipment can establish an X2 or S1 interface with the macro cell to perform the handover; receiving from the macro cell a data forwarding response message for indicating establishment of a wireless bearer with the macro cell;
(Continued)

MeNB : macro eNode B
PeNB : pico eNodeB
FeNB : femto eNode B

MUE : macro UE
PUE : pico UE
FUE : femto UE and transmitting the downlink data to the macro cell through the established wireless bearer, based on the data forwarding response message.

10 Claims, 18 Drawing Sheets

Related U.S. Application Data on Apr. 23, 2013, provisional application No. 61/835,622, filed on Jun. 16, 2013.

(51) Int. Cl.
*H04W 40/24* (2009.01)
*H04W 92/20* (2009.01)
*H04W 36/02* (2009.01)
*H04W 76/02* (2009.01)

(52) U.S. Cl.
CPC .......... *H04W 40/24* (2013.01); *H04W 76/025* (2013.01); *H04W 92/20* (2013.01)

(58) Field of Classification Search
CPC ... H04W 76/025; H04W 76/00; H04W 76/08; H04W 40/24
See application file for complete search history.

(56) References Cited

U.S. PATENT DOCUMENTS

| | | | | |
|---|---|---|---|---|
| 2012/0002643 A1* | 1/2012 | Chung | ................ | H04J 11/0093 370/331 |
| 2012/0210268 A1* | 8/2012 | Hilbrink | ............... | G06F 3/0484 715/773 |
| 2013/0143526 A1* | 6/2013 | Kanugovi | ......... | H04W 36/0083 455/411 |
| 2013/0165124 A1* | 6/2013 | Liang | ................ | H04W 36/0061 455/437 |
| 2013/0301439 A1* | 11/2013 | Heo | ...................... | H04W 76/048 370/252 |
| 2014/0057634 A1* | 2/2014 | Chang | ............... | H04W 36/0083 455/437 |
| 2014/0185588 A1* | 7/2014 | Zhu | ................... | H04W 36/0061 370/332 |
| 2014/0254554 A1* | 9/2014 | Liu | ................... | H04W 36/0055 370/331 |
| 2015/0016419 A1* | 1/2015 | Kim | ...................... | H04W 36/04 370/331 |
| 2015/0031369 A1* | 1/2015 | Gunnarsson | .......... | H04W 36/04 455/438 |
| 2015/0050934 A1* | 2/2015 | Jung | ................ | H04W 36/0083 455/437 |
| 2015/0334626 A1* | 11/2015 | Chen | ..................... | H04W 36/04 455/437 |
| 2016/0127961 A1* | 5/2016 | Wang | ................ | H04W 36/0061 370/331 |
| 2016/0205578 A1* | 7/2016 | Lee | ....................... | H04W 24/10 455/442 |
| 2016/0353511 A1* | 12/2016 | Gunnarsson | ........ | H04W 76/028 |

FOREIGN PATENT DOCUMENTS

| | | |
|---|---|---|
| WO | WO 2013/024335 A2 | 2/2013 |
| WO | WO 2013/029251 A1 | 3/2013 |

* cited by examiner

MeNB : macro eNode B    MUE : macro UE
PeNB : pico eNodeB       PUE : pico UE
FeNB : femto eNode B     FUE : femto UE

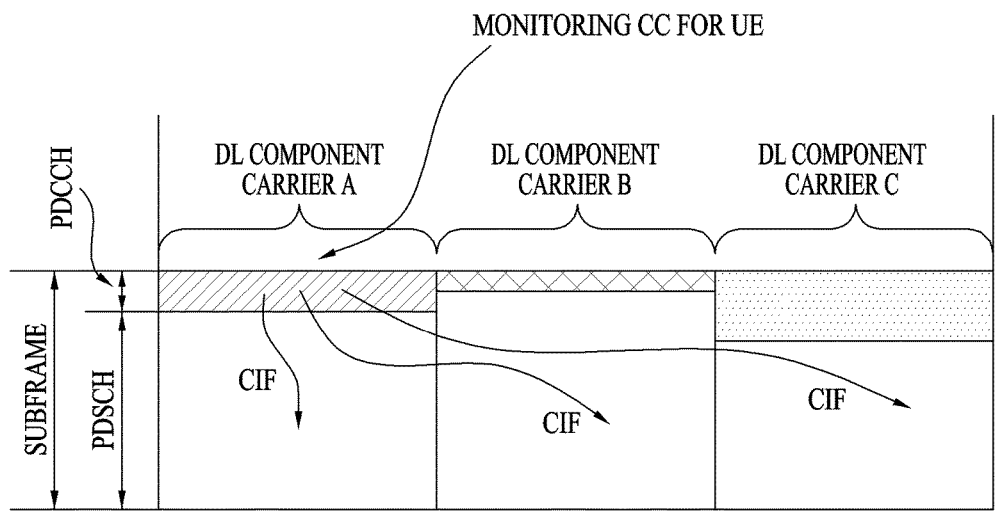
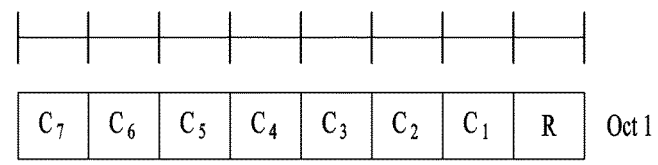

METHOD FOR TRANSMITTING DOWNLINK SIGNAL OF USER EQUIPMENT HAVING DUAL CONNECTIVITY IN HETEROGENEOUS CELL ENVIRONMENT

CROSS REFERENCE TO RELATED APPLICATIONS

This application is the National Phase of PCT International Application No. PCT/KR2014/002984, filed on Apr. 7, 2014, which claims priority under 35 U.S.C. 119(e) to U.S. Provisional Application No. 61/808,638, filed on Apr. 5, 2013, 61/815,229, filed on Apr. 23, 2013 and 61/835,622, filed on Jun. 16, 2013, all of which are hereby expressly incorporated by reference into the present application.

TECHNICAL FIELD

The present invention relates to a method and a base station (BS) for transmitting a downlink (DL) signal to a user equipment (UE) with dual connectivity in a heterogeneous cell deployment in which a macro cell and a small cell coexist.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network.

It is inefficient to additionally install a macro cell eNB in a complex urban environment like in a conventional art. This is because system throughput enhancement is not high compared with increase in costs and complexity for additional installment of macro cells due to shadow areas of a communication environment. Accordingly, in a new heterogeneous cell structure, a plurality of small cells coexists in a macro cell and serves corresponding UEs by resource allocation based on cell coordination. The heterogeneous cell structure is used to enhance quality of experience (QoE) by providing a high data transmission rate to a last user.

In small cell enhancements for E-UTRA and E-UTRAN study item (SI) as one of $3^{rd}$ generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conduced to draw advantages of concept of dual connectivity to small cell layers and a macro cell layer in which a user uses the same or different carriers.

DISCLOSURE

Technical Problem

An object of the present invention devised to solve the problem lies in a method for reliably transmitting downlink (DL) data of a small cell to a user equipment (UE) that performs handover in a heterogeneous cell deployment in which a macro cell and a small cell coexist.

Another object of the present invention devised to solve the problem lies in a method for transmitting DL data of a small cell to a UE by one or more macro eNB instead so as to transmit DL data to a UE in various network deployments.

Another object of the present invention devised to solve the problem lies in a method for dynamically transmitting data according to change in situation by adjusting a DL data path by a gateway as well as a macro cell.

Another object of the present invention devised to solve the problem lies in a method for reliably receiving DL data through a macro cell that is subjected to handover in a situation in which data cannot be received from the small cell as handover of the UE with dual connectivity is determined.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a downlink (DL) signal of a user equipment (UE) with dual connectivity by a small cell in a heterogeneous cell deployment in which a macro cell and the small cell coexist, the method including checking, by the small cell, that the UE performs handover to a second macro cell from a first macro cell, when an X2 interface with the second macro cell is capable of being formed, transmitting, by the small cell, a first data forwarding request message for requesting the second macro cell to transmit DL data of the small cell to the UE, receiving from the second macro cell, by the small cell, a first data forwarding response message for configuring a radio bearer with the second macro cell, and transmitting, by the small cell, the DL data to the second macro cell through the radio bearer configured based on the first data forwarding response message.

The method may further include, prior to the transmitting of the DL data to the second macro cell, transmitting to the second macro cell, by the small cell, a serial number (SN) status transfer message including information about a count value of a first packet to be transmitted to the UE by the second macro cell.

The method may further include, upon the checking that the UE performs the handover, determining whether the small cell supports dual connectivity of the UE together with the second macro cell, wherein the transmitting of the first data forwarding request message may include transmitting the first data forwarding request message when dual connectivity of the UE is not capable of being supported.

The method may further include receiving a target PCell information message indicating that the handover is performed, from the first macro cell, wherein the handover may be checked based on the target primary cell (PCell) information message.

The method may further include, when the second macro cell is not capable of transmitting the DL data to the UE, receiving, from the second macro cell, a data forwarding failure message including information about a reason why transmission of the DL data is not possible instead of receiving the first data forwarding response message from the second macro cell.

The method may further include, when the X2 interface with the second macro cell is not capable of being formed, transmitting a second data forwarding request message to the second macro cell through a mobility management entity (MME) that supports the small cell.

The method may further include receiving a second data forwarding response message through the MME from the second macro cell in response to the second data forwarding request message, and transmitting the DL data to the second macro cell through a radio bearer via a serving gateway (S-GW) that supports the small cell.

In another aspect of the present invention, provided herein is a small cell base station (BS) for transmitting a downlink (DL) signal of a user equipment (UE) with dual connectivity in a heterogeneous cell deployment in which a macro cell and a small cell coexist, the BS including a transmitter, a receiver, and a processor connected to the transmitter and the receiver and for controlling transmission of a DL signal of the UE, wherein the processor checks that the UE performs handover to a second macro cell from a first macro cell, when an X2 interface with the second macro cell is capable of being formed, controls the transmitter to transmit a first data forwarding request message for requesting the second macro cell to transmit DL data of the small cell to the UE, controls the receiver to receive a first data forwarding response message for command of configuring a radio bearer with the second macro cell from the second macro cell, and controls the transmitter to transmit the DL data to the second macro cell through the radio bearer configured based on the first data forwarding response message.

Advantageous Effects

The embodiments of the present invention may have the following advantageous effects.

First, even if a user equipment (UE) with dual connectivity performs handover in a heterogeneous cell deployment, downlink (DL) data from a can be reliably received.

Second, a UE instead can receive DL data from one or more macro eNB so as to ensure DL data reception in various network deployments.

Third, a gateway as well as data forwarding through a bearer with an eNB can change a transmission path of DL data so as to more effectively and reliably transmit data to the UE.

Fourth, when a UE can perform handover and thus cannot receive data from a small cell, DL data from a cell subjected to handover can also be obviously received.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a diagram illustrating cross scheduling in the case of aggregation of a plurality of carriers according to the present invention;

FIG. 4 is a diagram for explanation of a MAC control element associated with the present invention;

BEST MODE

Figure 1:
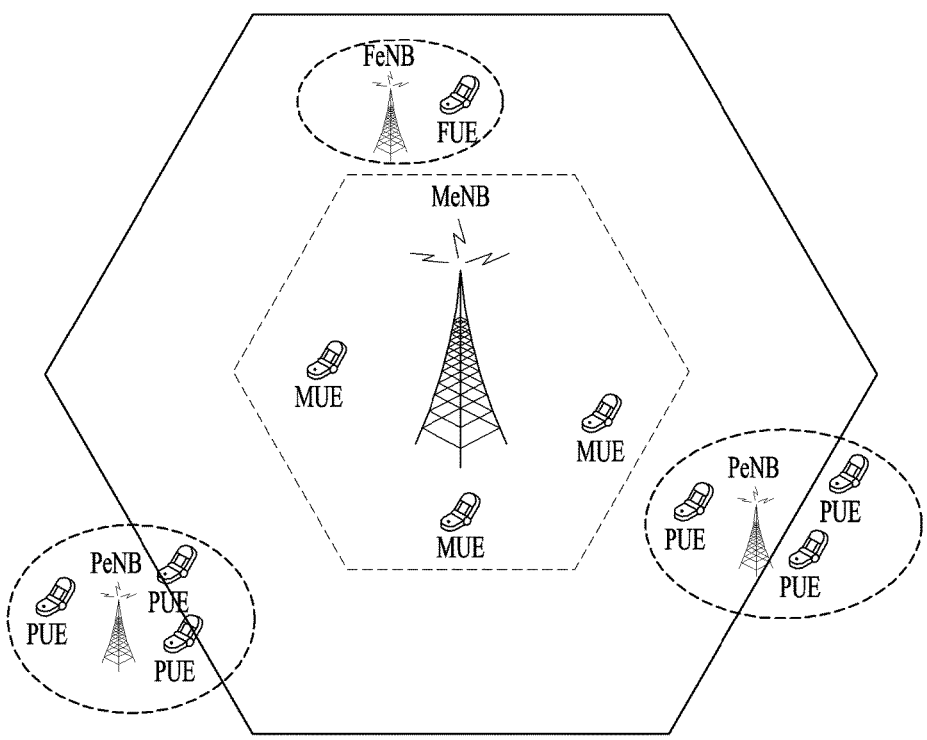
FIG. 1 illustrates a heterogeneous network wireless deployment according to the present invention.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

In addition, the expression that a device communicates with a 'cell' means that the device transmits and receives signals to and from an eNB of the corresponding cell. That is, an actual object to and from which the device transmits and receives signals may be a specific eNB. However, for convenience of description, the device transmits and receives signals to and from a cell formed by the specific cell. Similarly, the terms 'macro cell' and/or 'small cell' may refer to corresponding specific coverage and also refer to 'an eNB for supporting a macro cell' and/or 'a small cell eNB for supporting a small cell'.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each serve corresponding UEs by resource allocation based on cell coordination.

The above small cells are categorized into two types depending on their access schemes of UEs. First, small cells using open access subscriber group (OSG) or non closed subscriber group (Non-CSG) scheme are accessible to UEs connected to a macro cell and/or UEs connected to other small cells. The OSG or Non-CSG scheme enables handover to the small cells from other cells.

Second, small cells using a closed subscriber group (CSG) scheme are not accessible to unauthorized UEs connected to a macro cell and/or unauthorized UEs connected to other small cells. In addition, the CSG scheme does not allow handover to the small cells from other cells.

2. Carrier Aggregation and Dual Connectivity

Figure 2:
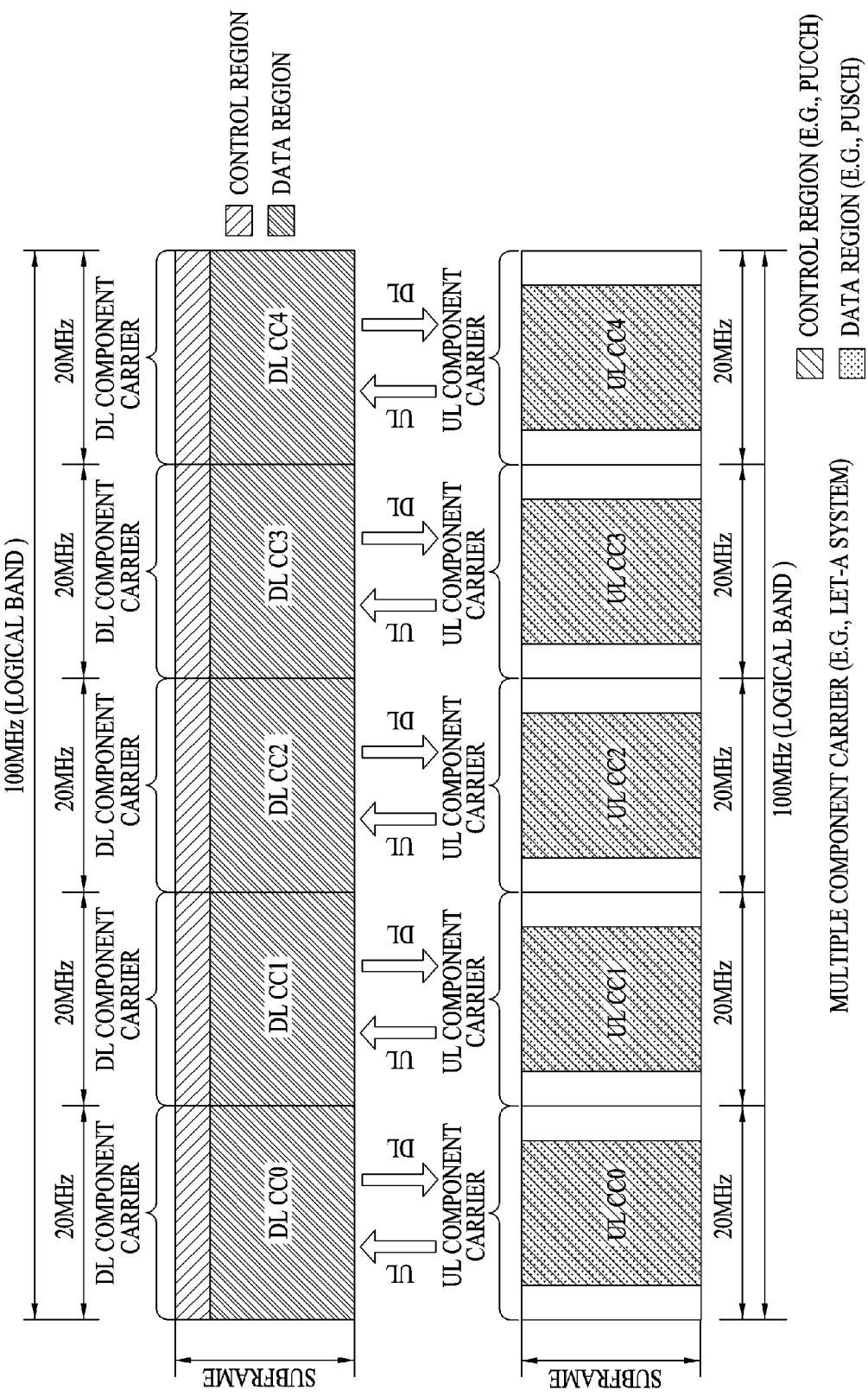
FIG. 2 is a diagram illustrating carrier aggregation according to the present invention.

FIG. 2 is a diagram illustrating carrier aggregation according to the present invention.

Referring to FIG. 2, a communication system may collect a plurality of uplink/downlink component carriers (CCs) to support wider uplink/downlink bandwidths. The term "CC" may be replaced with other equivalent terms (e.g., a carrier, a cell, etc.). CCs may or may not be adjacent to each other in the frequency domain. A bandwidth of CCs may be independently determined. Asymmetrical carrier aggregation with UL CCs and DL CCs, the numbers of which are different, is possible. Control information may be configured to be transmitted and received through a specific CC. The specific CC may be referred to as a primary CC (or an anchor CC) and the remaining CCs may be referred to as a secondary CC.

When cross-carrier scheduling (or cross-CC scheduling) is applied, PDCCH for downlink allocation may be transmitted to DL CC#0, and the corresponding PDSCH may be transmitted to DL CC#2. Moreover, for cross-CC scheduling of LTE-advanced (LTE-A) UEs, the introduction of carrier indicator field (CIF) has been considered. Configuration for the presence or absence of the CIF within PDCCH is semi-statically and UE-specifically (UE-group-specifically) enabled by higher layer signaling (e.g., RRC signaling). The baseline of PDCCH transmission is summarized as below.

1) CIF disabled: PDCCH on a DL CC assigns PDSCH resources on the same DL CC or PUSCH resources on a single linked UL CC
1-1) No CIF
1-2) The same as Rel-8 PDCCH structure (the same coding and the same CCE-based resource mapping) and DCI formats
2) CIF enabled: PDCCH on a DL CC can assign PDSCH or PUSCH resources in one of multiple aggregated DL/UL CCs using the CIF
2-1) LTE DCI format extended with the CIF
2-1-1) CIF (if configured) is a fixed x-bit field (e.g., x=3)
2-1-2) CIF (if configured) location is fixed irrespective of DCI format size
2-2) Reusing LTE PDCCH structure (the same coding and the same CCE-based resource mapping)

FIG. 3 is a diagram illustrating cross scheduling in the case of aggregation of a plurality of carriers according to the present invention.

In the case of presence of CIF, the eNB may assign the PDCCH monitoring DL CC set for reduction of blind decoding complexity at the UE side. The PDCCH monitoring DL CC set is a portion of the entire aggregated DL CCs and includes one or more DL CC, and the UE only performs detection/decoding of PDCCHs on the corresponding DL CC. In other words, upon scheduling PDSCH/PUSCH for a UE, the eNB transmits PDCCHs only through the PDCCH monitoring DL CC set. The PDCCH monitoring DL CC set may be set UE-specifically, UE-group-specifically, or cell-specifically. The term "PDCCH monitoring DL CC" may be replaced with the equivalent terms such as a monitoring carrier, a monitoring cell, etc. In addition, CCs aggregated for the UE may be replaced with the equivalent terms such as a serving CC, a serving carrier, a serving cell, etc.

As illustrated in FIG. 3, three DL CCs may be aggregated. In FIG. 3, DL CC A is configured as the PDCCH monitoring DL CC. DL CC A, B, and C may each be referred to as a serving CC, a serving carrier, a serving cell, etc. When the CIF is disabled, each DL CC can transmit only the PDCCH scheduling its own PDSCH without the CIF according to LTE PDCCH configuration. On the other hand, when the CIF is enabled by UE-specific (or UE-group-specific or cell-specific) higher layer signaling, only DL CC A (monitoring DL CC) can transmit the PDCCHs scheduling not only its own PDSCH but also PDSCHs of the other CCs using the CIF. In this case, no PDCCH is transmitted on DL CC B and C which are not configured as the PDCCH monitoring DL CC. Accordingly, DL CC A (monitoring DL CC) needs to include all of a PDCCH search range associated with DL CC A, a PDCCH search range associated with DL CC B, and a PDCCH search range associated with DL CC C. In this specification, it is assumed that the PDCCH search ranges are defined for the respective carriers.

As described above, LTE-A has considered the introduction of CIF for cross-CC scheduling. Whether the CIF is used (that is, whether a cross-CC scheduling mode or a non-cross-CC scheduling mode is supported) and conversion between modes may be configured via RRC signaling semi-statically/UE-specifically. The UE may perform the RRC signaling and then check whether the CIF is used in PDCCH scheduled to the UE.

FIG. 4 is a diagram for explanation of a MAC control element associated with the present invention. The MAC control element that activates/deactivates a cell is identified by a subheader of a MAC PDU. As illustrated in FIG. 4, the MAC control element may include a single octet containing 7 C-fields and one R-field and have a fixed size.

The C-field indicates that a small cell indicated by the corresponding field needs to be activated/deactivated. When a value of the C-field is '1', the field may indicate that the small cell shall be activated, and when the value of the C-field is '0', the field may indicate that the small cell shall be deactivated. The R-field may be set to '0' as a reserved bit.

Figure 5:
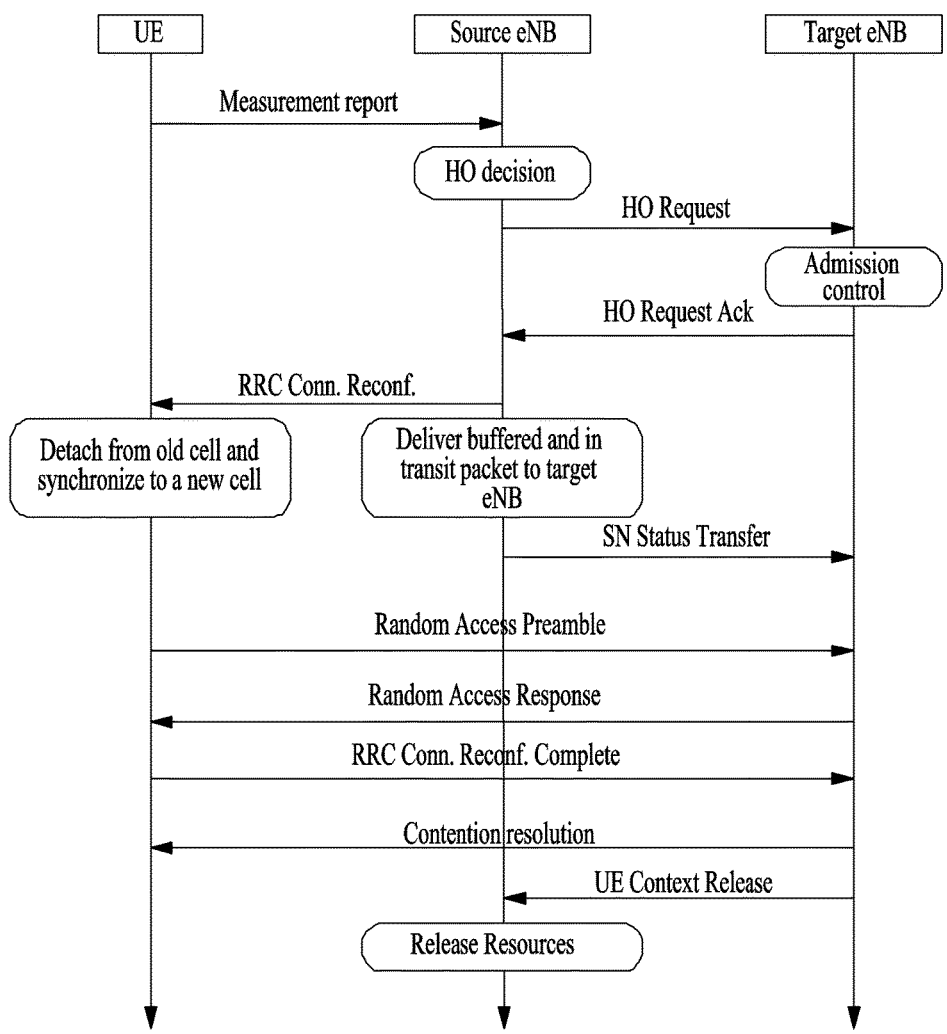
FIG. 5 is a diagram for explanation of a handover procedure associated with the present invention.

FIG. 5 is a diagram for explanation of a handover procedure associated with the present invention.

A UE may change connection with an eNB from one eNB to another eNB via a handover procedure. The connected eNB may be referred to as a source eNB, and a newly connected target eNB may be referred to as a target eNB.

The UE may communicate with the source eNB to transmit a measurement report message about a communication state with the source eNB. The source eNB may determine handover of the UE and request connection with the UE to the target eNB. When the target eNB transmits an acknowledgement (ACK) message according to handover admission of the target eNB, the source eNB may transmit an RRC connection reconfiguration message to the UE to command the UE to be connected to the target eNB.

Then, the UE may release connection with the source eNB and perform synchronization with the target eNB. The source eNB may forward a packet and so on, which have been subject to communication with the UE, to the target eNB such that the target eNB continuously communicates with the UE. The source eNB may transmit a serial number (SN) status along with the packet to the target eNB.

The UE may perform a random access procedure in order to establish new connection with the target eNB. When the UE is successfully connected to the target eNB via a contention resolution procedure, the target eNB may command the source eNB to release connection with the UE. The source eNB may release connection with the UE to re-ensure a resource allocated to the UE.

Figure 6:
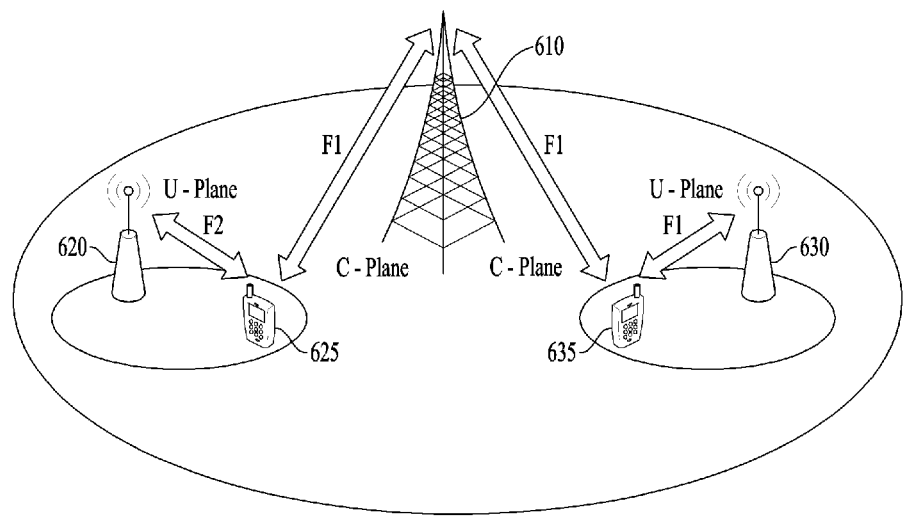
FIG. 6 is a diagram for explanation of dual connectivity according to the present invention.

FIG. 6 is a diagram for explanation of dual connectivity according to the present invention.

UEs 625 and 635 within the coverage of first and second small-cell eNBs 620 and 630 may be connected simultaneously to a small cell and a macro cell by a macro-cell eNB 610. The UEs 625 and 635 may receive a service from a macro cell or a small cell simultaneously or in a time division multiplying (TDM) scheme. Backhaul between the macro cell and the small cell may be ideal backhaul or non-ideal backhaul.

The UEs 625 and 635 may receive a service of control plane (C-plane) functionalities (connection management and mobility) through a macro cell layer. In addition, the UEs 625 and 635 may select user plane (U-plane) functionalities from the macro cell and/or the small cell and receive a service of the U-plane functionalities. FIG. 6 illustrates an embodiment in which a small cell is a data path of the U-plane.

For example, data may be transmitted in real time by a service such as voice over long term evolution (VoLTE). When the UEs 625 and 635 moves and receives from the VoLTE service from a small cell, interruption of the service may occur frequently. Thus, the UEs 625 and 635 may receive a service from a macro cell in which continuity is ensured relative to a small cell. On the other hand, the UEs 625 and 635 may receive a service that requires high efficiency from a small cell.

The macro cell and the small cell may perform carrier aggregation. That is, the macro cell and the small cell may user the respective random n and k (n and k are natural numbers) carriers. In this case, carriers of the macro cell and small cell may be different or some carriers may be commonly used by the macro cell and small cell. For example, the macro cell may use subcarriers with frequencies f1 and f2 and the small cell may use subcarriers with frequencies f2 and f3.

Referring to FIG. 6, the macro-cell eNB 610 and the first small-cell eNB 620 may uses subcarriers with different frequencies F1 and F2. On the other hand, the macro-cell eNB 610 and the second small-cell eNB 630 may use the same frequency band F1 in order to provide a service to the UEs 625 and 635. The UEs 625 and 635 configured to have dual connectivity may be simultaneously connected to both a macro cell by the macro-cell eNB 610 and a small cell by the small-cell eNBs 620 and 630.

A detailed description will be given in such a way that the aforementioned dual connectivity is similar to inter-site (or inter-band) carrier aggregation for aggregating carriers in different bands. That is, the detailed description will be given in such a way that a macro cell is a primary cell (PCell) by a primary CCE in carrier aggregation and a small cell is a secondary cell (SCell) by a secondary CC in carrier aggregation.

However, dual connectivity in a heterogeneous network deployment needs to be distinguished from carrier aggregation. That is, dual connectivity between a macro cell and a small cell is interpreted as adding geographical/positional concept, but not carrier aggregation in a single eNB. In more detail, when the UEs 625 and 635 are positioned in a small cell by the first small-cell eNB 620 or positioned in a small cell by the second small-cell eNB 630, the UEs 625 and 635 may simultaneously communicate with the first and second small-cell eNBs 620 and 630 that are geographically/positionally separated while receiving a service from the macro-cell eNB 610.

3. Method for Transmitting DL Data

The legacy LTE (Rel-8/9) and LTE-A considers carrier aggregation in order to configure PCell and SCell(s) for one UE by an eNB. The PCell and SCell configured to the UE via carrier aggregation are scheduled by the same scheduler.

However, when a UE has dual connectivity in the aforementioned heterogeneous network deployment (that is, when the UE is simultaneously connected to both a macro cell and a small cell), the UE may be independently scheduled with respect to the macro cell and the small cell from separate schedulers. That is, the UE may be scheduled with the PCell from the macro cell and scheduled with the SCell from the small cell.

When separate schedulers respectively perform scheduling on UEs with dual connectivity, if they do not share scheduling information, unpredicted problems may occur. Hereinafter, a method for overcoming problems that arise when a UE with dual connectivity is independently scheduled by a separate scheduler will be proposed.

Hereinafter, independent scheduling of a separate scheduler does not indicate that cross scheduling is excluded in carrier aggregation. That is, when cross scheduling is not applied, a macro cell and a small cell can independently schedule their own resources. On the other hand, when cross scheduling is applied, each scheduler may perform scheduling by exchanging data, scheduling associated resource information, channel state information (CSI) of a channel, and so on between the macro cell and the small cell.

The UE having dual connectivity may be allocated resources from different network points (e.g., a master eNB and a secondary eNB) connected via non-ideal backhaul. In this case, the master eNB (MeNB) may function as a mobility anchor to an eNB corresponding to S1-MME connection from a core network (CN) in dual connectivity. A group of serving cells associated with the master eNB may be defined as a master cell group. A secondary eNB (SeNB) is an eNB for providing additional resources for a UE and may be defined to be distinguished from a master eNB (i.e., the SeNB may be defined as an eNB that is not the master eNB). In addition, similarly to a master cell group, a group of serving cells associated with the SeNB may be defined as a secondary cell group.

In this specification, the UE having dual connectivity may receive a service from a PCell via connection with a macro cell and may receive a service from a SCell via connection with a small cell. That is, in this specification, an operation performed on the "PCell" may refer to an operation performed on a "macro cell" that serves the PCell, and an operation performed on the "SCell" may refer to an operation performed on a "small cell" that serves the SCell.

However, the terms are selected for convenience of description only. That is, terms "PCell" and "SCell" may be interpreted as various meanings according to a cell type and are not limited to the aforementioned meanings. For example, the "PCell" and the "SCell" may refer to a macro cell and a small cell, respectively and also refer to the "master eNB" and the "secondary eNB", respectively. In addition, the "PCell" and the "SCell" may refer to the "master cell group" associated with the MeNB and the "secondary cell group" associated with the SeNB, respectively.

Figure 7:
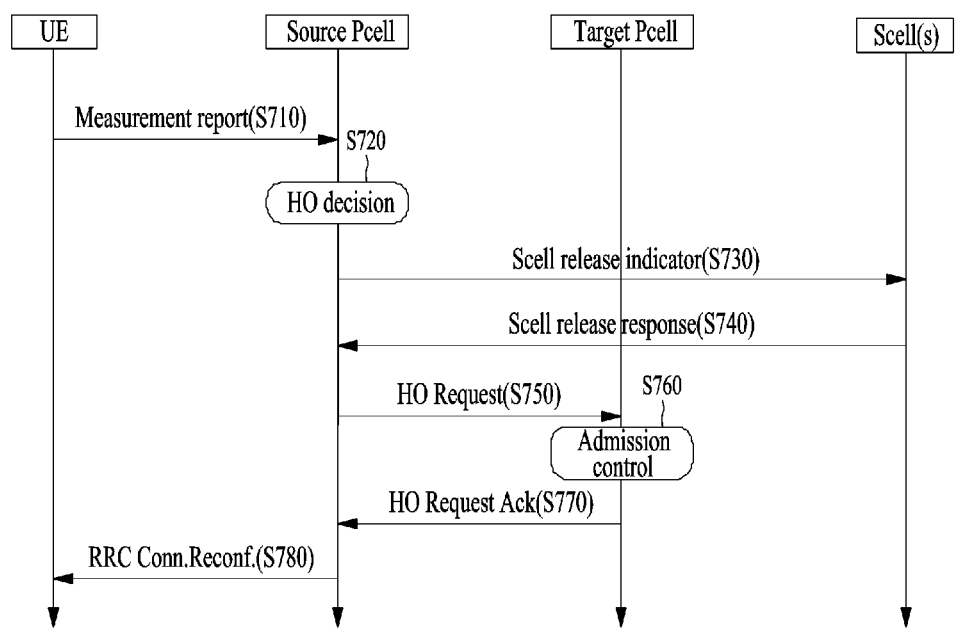
FIG. 7 is a diagram for explanation of a handover procedure of a UE with dual connectivity according to an embodiment of the present invention.

FIG. 7 is a diagram for explanation of a handover procedure of a UE with dual connectivity according to an embodiment of the present invention. In the legacy LTE and LTE-A, a PCell and a SCell are configured by the same eNB. Accordingly, when an eNB determines handover of the UE, the UE may stop scheduling for the UE during handover.

However, in a heterogeneous cell deployment in which a macro cell and a small cell coexist. A PCell and a SCell may have separate schedulers. Accordingly, when the PCell determines handover with respect to a UE having dual connectivity between a macro cell and a small cell, there may be a problem in that the SCell cannot recognize this fact and the UE continuously performs scheduling. Accordingly, when the PCell determines handover of the UE in order to overcome this problem, the PCell needs to notify SCells configured for the UE about whether the UE performs handover.

First, a source PCell that supports the UE with dual connectivity may receive a measurement report message from the UE (S710) and the UE may determine that the UE performs handover on a target PCell (S720). Then a source PCell may transmit a SCell release indicator message for command of stopping scheduling for the UE to one or more SCells configured to the connect4ed to the UE (S730).

The SCell release indicator message may include at least one of "a message type, an ID (PCID or ECGI) of the PCell, an ID (PCID or ECGI) of the SCell, and an ID (C-RNTI or UE X2AP ID) and/or SCellindex of the UE in the PCell (or SCell)" and may be transmitted through backhaul (e.g., an X2 interface or an air interface) between the PCell and the SCell.

After completely transmitting and receiving data scheduled for the UE, the SCell may transmit a SCell release response message to the PCell (S740). The SCell release response message may include at least one of "a message type, an ID (PCID or ECGI) of the PCell, an ID (PCID or ECGI) of the SCell, and an ID (C-RNTI or UE X2AP ID) and/or SCellindex of the UE in the PCell (or SCell)" and may be transmitted through the aforementioned backhaul.

Upon receiving a SCell release response message from the SCell, the source PCell may transmit a handover (HO) request message to the target PCell (S750). The target PCell may admit handover of the UE (760) and transmit a HO request Ack message to the source PCell (S770). Then the source PCell may transmit a RRC connection (re)configuration message to the UE (S780) to configure connection between the UE and the target PCell.

The source PCell may set a timer corresponding to a preset time period along with transmission of the SCell release indicator message. Accordingly, the source PCell may re-transmit a SCell release indicator message to the SCell when the source PCell does not receive a SCell release response message from the SCell that transmits the SCell release indicator message even after the timer expires. In this case, the source PCell may pre-define a maximum number of times for repeatedly re-transmitting the SCell release indicator message until the SCell release response message is received from the SCell.

As described above, when the PCell releases the SCell or performs handover to the UE with dual connectivity, there may be a problem in that the UE cannot receive DL data stored in a buffer of the SCell and/or DL data that is newly transmitted from a packet data gateway (P-GW), from the SCell. Accordingly, there is a need for a method for transmitting DL data to the UE with dual connectivity in a heterogeneous cell deployment.

Figure 16:
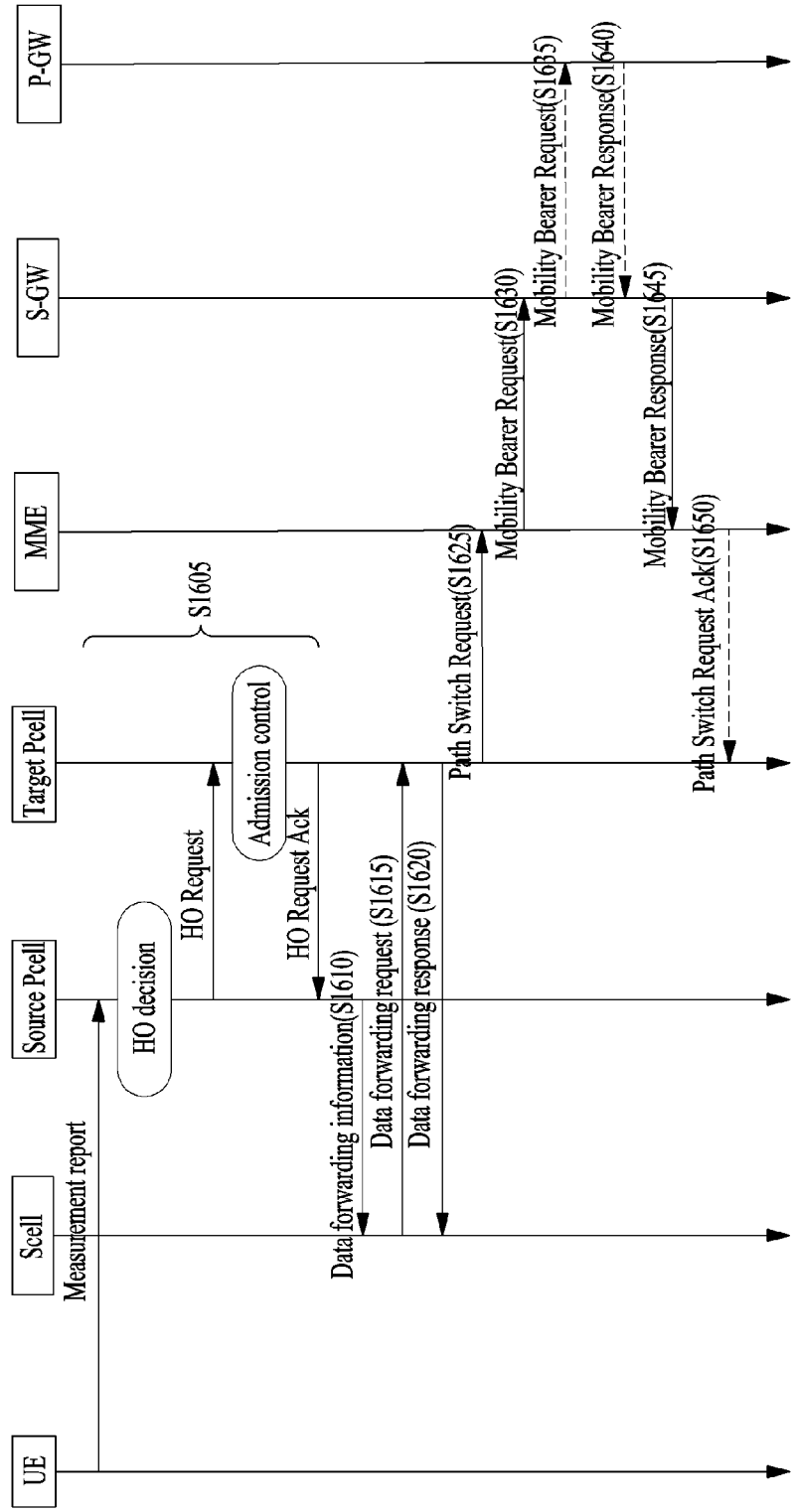
FIG. 16 is a diagram illustrating a method for transmitting DL data according to an embodiment of the present invention.
Figure 17:
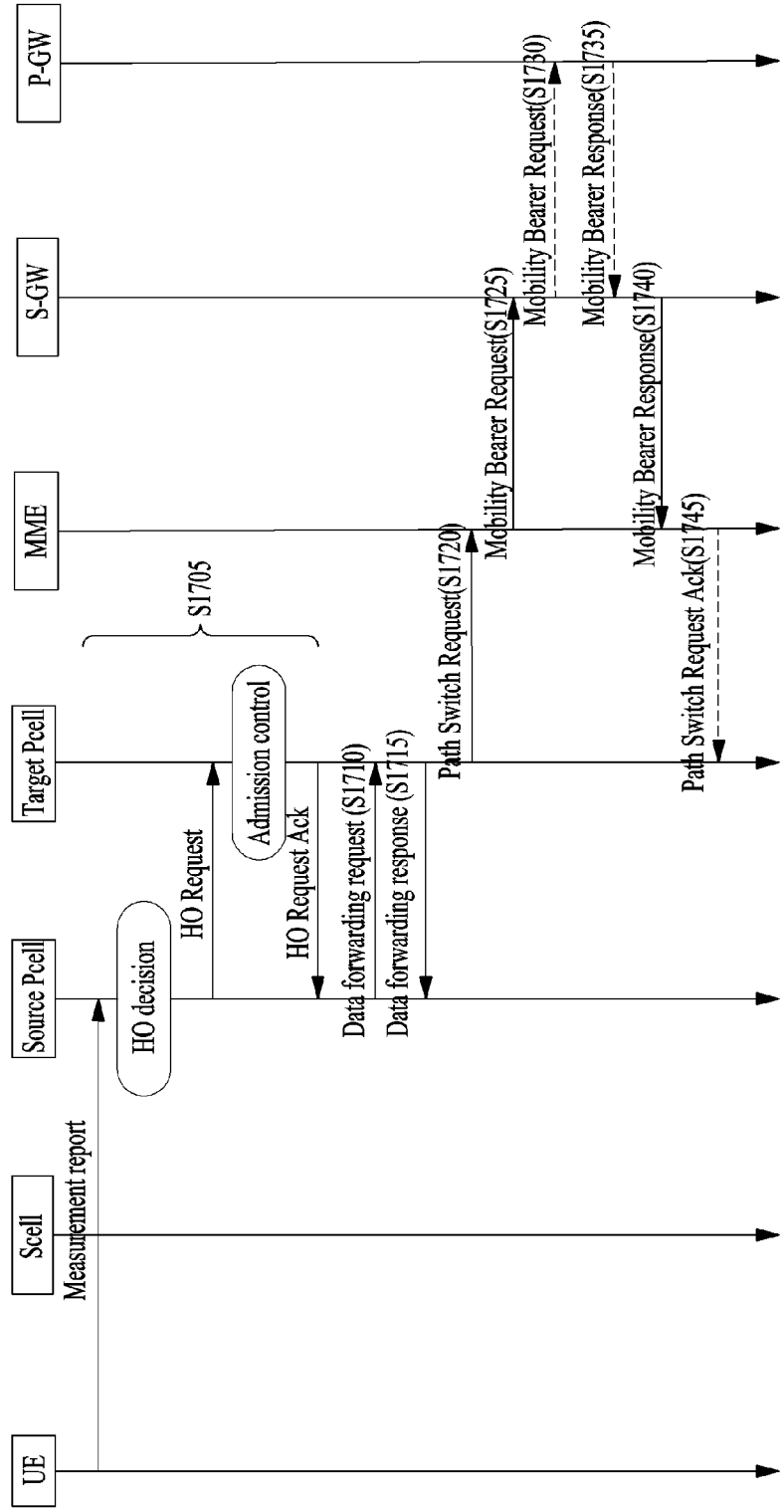
FIG. 17 is a diagram illustrating a method for transmitting DL data according to an embodiment of the present invention.
Figure 18:
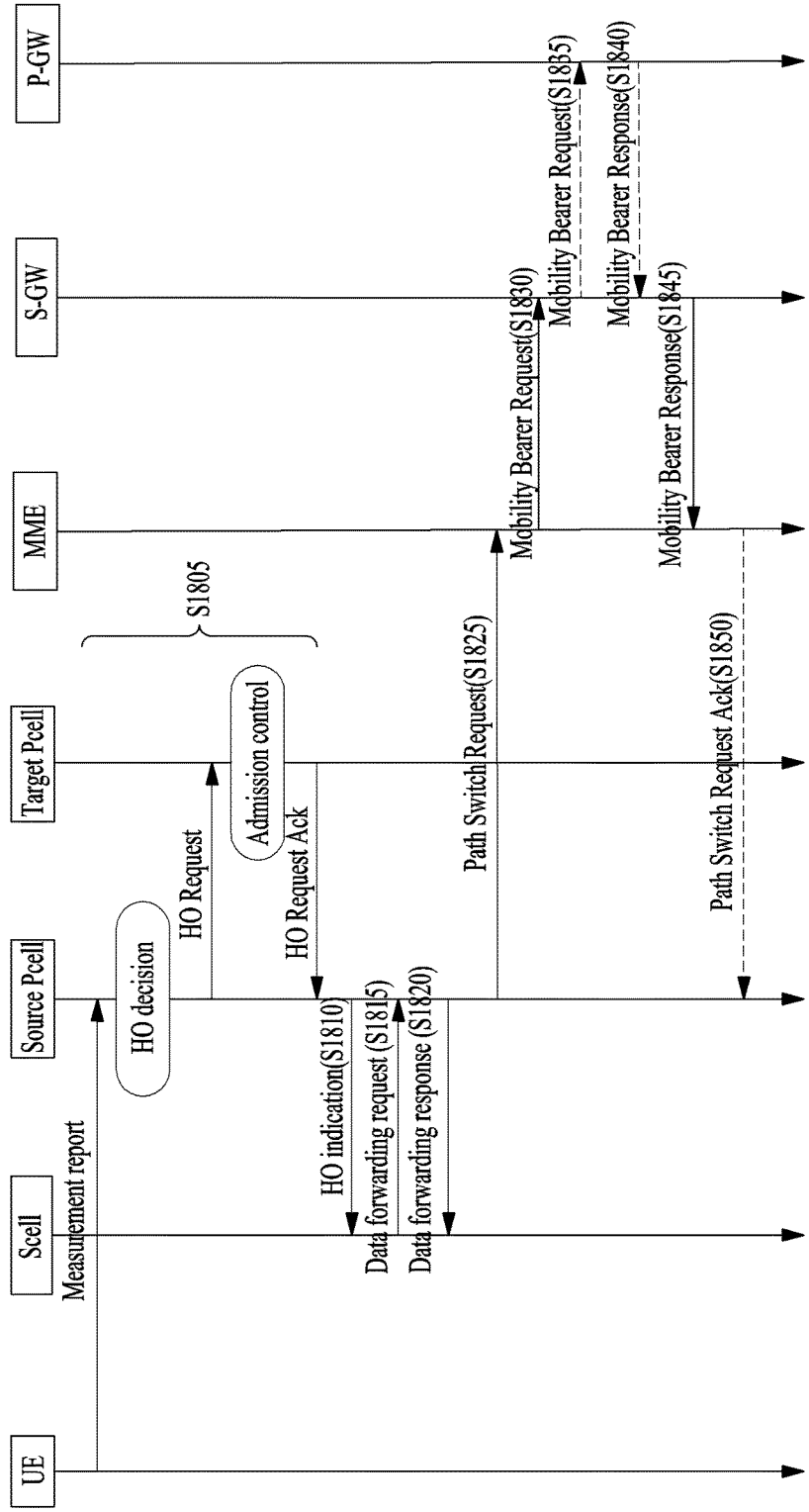
FIG. 18 is a diagram illustrating a method for transmitting DL data according to an embodiment of the present invention.

Hereinafter, various embodiments for overcoming the aforementioned problems will be explained. First, FIGS. 8 to 15 illustrate an embodiment for generating a direct bearer or indirect bearer for data forwarding for a SCell. FIGS. 16 to 18 illustrate an embodiment for switching a path of data to be transmitted to a SCell from a serving gateway (S-GW).

Figure 8:
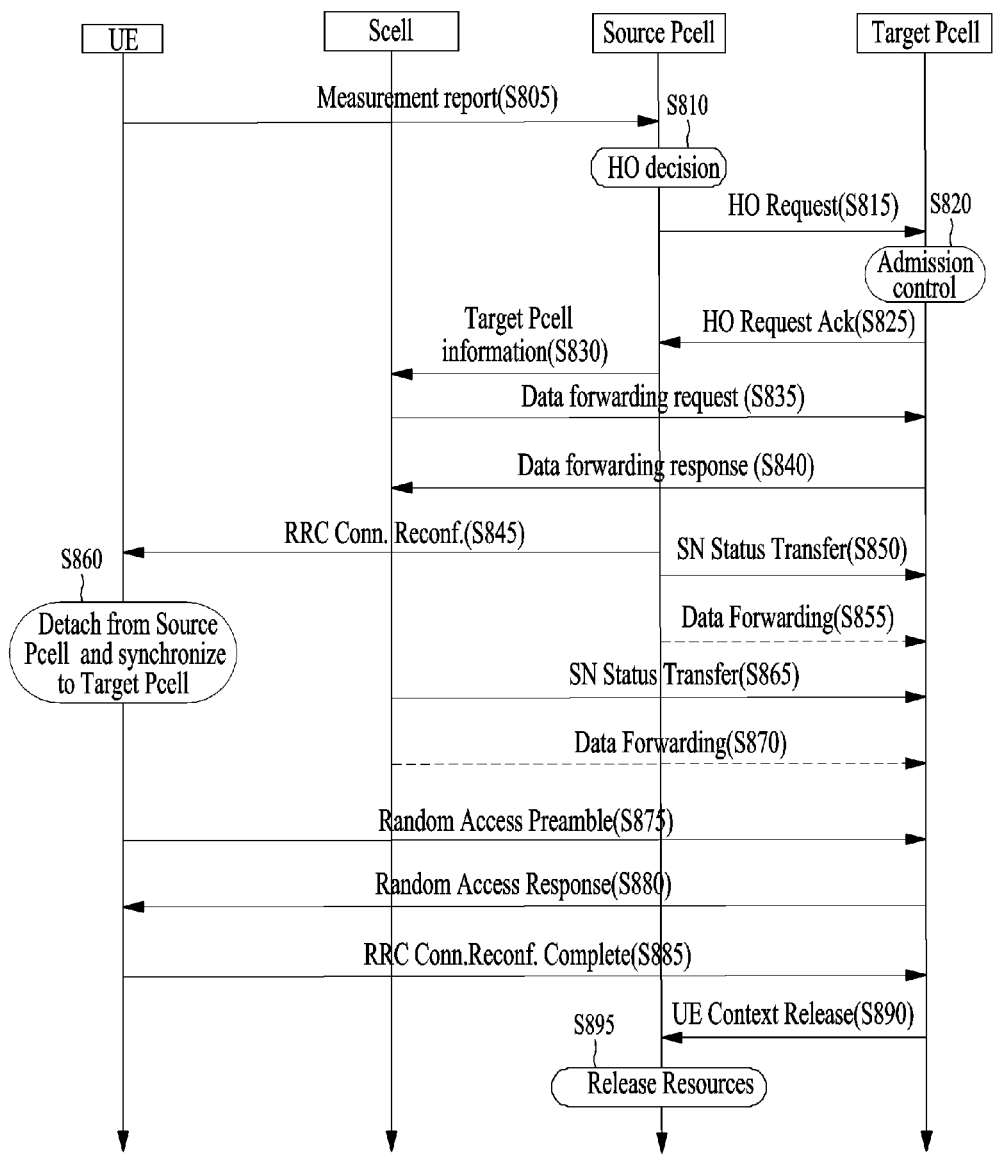
FIG. 8 is a diagram illustrating a method for transmitting downlink (DL) data according to an embodiment of the present invention.

FIG. 8 is a diagram illustrating a method for transmitting DL data according to an embodiment of the present invention. FIGS. 8 to 11 illustrate an embodiment for generating direct/indirect bearers for data forwarding of the SCell between the SCell and the target PCell. FIG. 8 illustrates an embodiment in which the SCell generates a direct bearer when requesting the target PCell for data forwarding.

The source PCell may receive a measurement report message from the UE with dual connectivity (S805). The source PCell may determine that the UE performs handover to the target PCell from the source based on a measurement value included in the measurement report message (S810). The source PCell that determines handover to the target PCell may transmit a HO request message to the target PCell (S815). When quality of service and so on of the UE can be ensured, the target PCell may transmit a HO request Ack message to the source PCell (S820 and S825).

The source PCell may transmit a target PCell information message including at least one of "an ID (PCID or ECGI) of the source PCell, an ID (PCID or ECGI) of the target PCell to be determined as a target of handover of the UE, an indicator indicating that handover to the target PCell is to be performed, and/or an ID (C-RNTI or UE X2AP ID) of the UE in the PCell or the SCell" to the SCell (S830). The target PCell information message may be a message indicating that the UE performs the aforementioned handover.

The SCell that checks that the UE performs handover according to the message received from the source PCell may determine whether the target PCell and the SCell can support dual connectivity of the UE. That is, the SCell may determine whether dual connectivity maintained for connection between the UE and the source PCell and SCell can also be maintained between the SCell and the target PCell as a target of handover of the UE.

When dual connectivity of the UE with respect to the target PCell can also be supported, the SCell may transmit DL data of the SCell to the UE. However, when the SCell cannot support dual connectivity of the UE with respect to the target PCell, there is a need for a method for reliably forward DL data of the SCell to the UE. That is, when the SCell cannot support the UE together with the target PCell, the SCell cannot maintain connection with the UE as handover of the UE is terminated. Accordingly, the SCell needs to prepare a method for forwarding DL data of the SCell to the UE.

Accordingly, the SCell may determine to forward data through the target PCell so as to receive DL data of the SCell even if the UE performs handover. Accordingly, the SCell may transmit a data forwarding request message to the target PCell (S835). The data forwarding request message may include at least one of "a message type, a PCID or GCID of the target PCell, a PCID or GCID of the SCell, and/or a C-RNTI configured for the UE in the PCell (or SCell)".

Accordingly, the SCell may determine to forward data through the target PCell so as to receive DL data of the SCell even if the UE performs handover. Accordingly, the SCell may transmit a data forwarding request message to the target PCell (S835). The data forwarding request message may include at least one of "a message type, an ID (PCID or ECGI) of the target PCell, an ID (PCID or ECGI) of the SCell, an ID (C-RNTI or UE X2AP ID) configured for the UE in the PCell (or SCell), and/or context information of the UE in the SCell (e.g., Qos class identifier (QCI) of E-UTRAN Radio Access Bearer (E-RAB)), allocation and retention priority (ARP), user equipment-aggregated maximum bit rate (UE-AMBR), and so on".

When X2 connection between the target PCell and the SCell can be formed, the target PCell that receives the data forwarding request message may allocate an ID of a data radio bearer (DRB) in order to forward a packet to the UE. Then the target PCell may allocate a X2 target PCell TEID (DL tunnel endpoint identifier (TEID) of an X2 GTP tunnel) to the SCell in order to configure an X2 transmission bearer (i.e., general packet radio service (GPRS) tunneling protocol tunnel (GTP tunnel)) for transmission of DL data to be forwarded to the UE by the SCell to the target PCell. The target PCell may transmit a data forwarding response message to the SCell such that the SCell configures the X2 transmission bearer for forwarding DL data to the target PCell from the allocated X2 target PCell TEID value (S840).

The data forwarding response message may include at least one of "a message type, an ID (PCID or ECGI) of the target PCell, an ID (PCID or ECGI) of the SCell, an X2 target PCell TEID, and/or an ID (C-RNTI or UE X2AP ID)

of the UE in the PCell (or SCell)". The SCell that receives the data forwarding response message may configure an X2 transmission bear (i.e., a GTP tunnel) for data forwarding.

On the other hand, when the target PCell does not satisfies the QoS of the UE in the Scell or load is excessive such that there is no room for forwarding data of the SCell for the UE, the target PCell may transmit a data forwarding failure message to the SCell. The data forwarding failure message may include at least one of "a message type, an ID (PCID or ECGI) of the target PCell, an ID (PCID or ECGI) of the SCell, Cause (reason for data forwarding failure), and/or an ID (C-RNTI or UE X2AP ID) of the UE in the PCell (or SCell)".

Then the source PCell may transmit a RRC (re)configuration message to the UE (S845). The UE that receives the RRC (re)configuration message may recognize that the UE performs handover to the target PCell. In addition, upon receiving the RRC (re)configuration message, the UE may detach connection with the source PCell and the SCell and perform synchronization to the target PCell (S860).

In a conventional handover procedure, the source PCell may transmit a serial number (SN) status transfer message to the target PCell (S850) and forward data of the source PCell to the target PCell to provide the data to the UE (S855). However, in the proposed method, in addition to this procedure, the SCell may transmit the SN status transfer message to the target PCell through an X2 interface (S865). The SN status transfer message may include a DL count value and a UL count value. Accordingly, the target PCell may recognize information about a count of a first packet to be transmitted to the UE and a count of a first packet to be received from the UE and may recognize a packet in which transmission and reception is to be started with respect to the UE.

The target PCell that receives the SN status transfer message from the SCell may receive data forwarding from the SCell (S870). Steps (S875, S880, S885, S890, and S895) after S870 may be performed similarly to the conventional handover procedure described with reference to FIG. 5.

Figure 9:
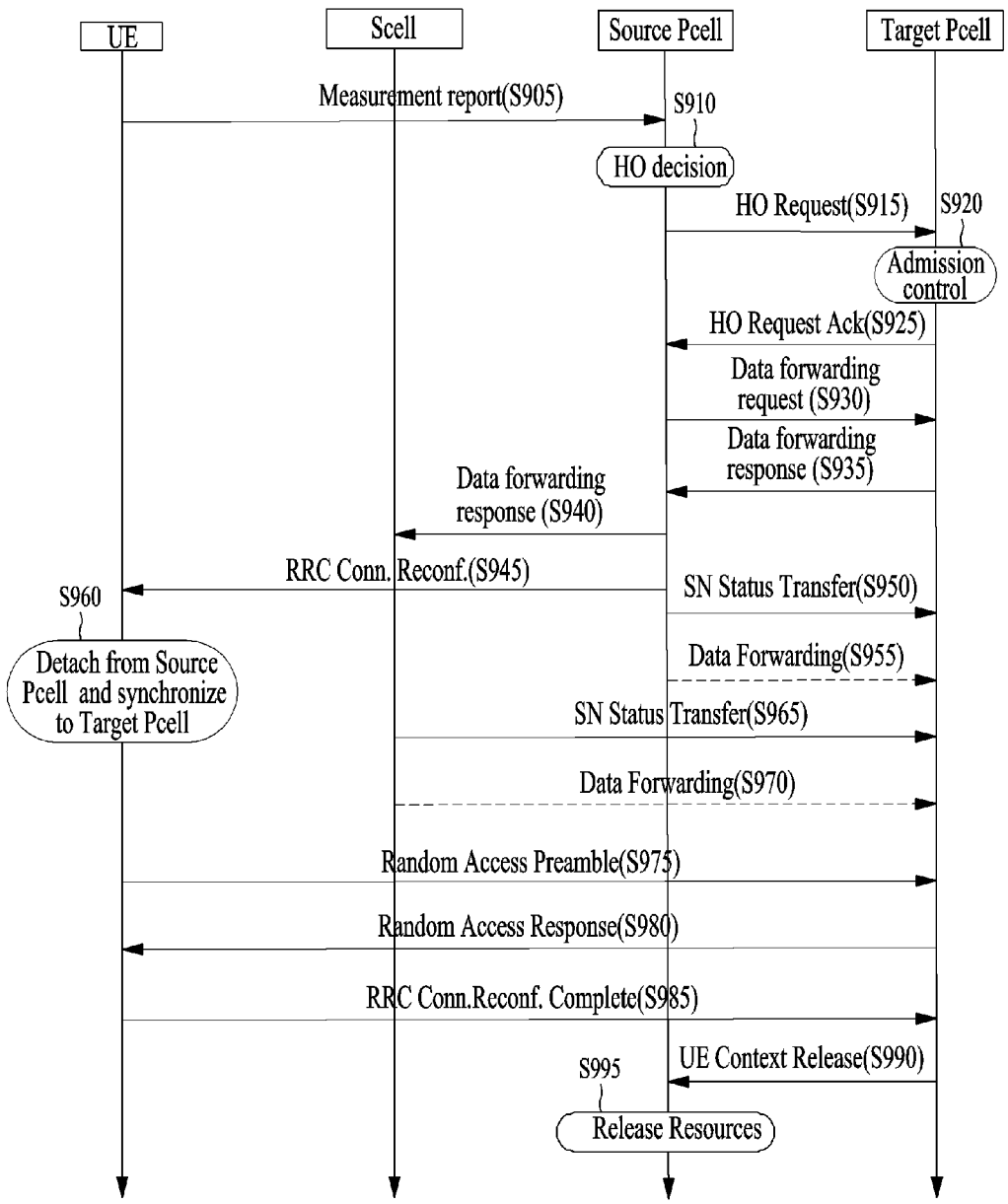
FIG. 9 is a diagram illustrating a method for transmitting DL data according to an embodiment of the present invention.

FIG. 9 is a diagram illustrating a method for transmitting DL data according to an embodiment of the present invention. FIG. 9 illustrates an embodiment in which a direct bearer is generated when a source PCell requests a target PCell for data forwarding.

The source PCell may receive a measurement report message from a UE for supporting dual connectivity (S905) and the UE may determine to perform handover to the target PCell from the source PCell (S910). The source PCell may transmit a HO request message to the target PCell (S915) and steps S920 and S925 for receiving a HO request Ack message through an admission procedure from the target PCell may be performed similarly to in FIG. 8.

The source PCell that checks that the UE performs handover may determine whether the target PCell and the SCell can support dual connectivity of the UE. That is, the source PCell may determine whether dual connectivity maintained for connection between the UE and the source PCell and SCell can also be maintained between the SCell and the target PCell as a target of handover of the UE. Like in the description of FIG. 8, when the SCell cannot support dual connectivity of the UE after handover, the source PCell may perform the following procedure in order to forward DL data of the SCell to the UE.

The source PCell may determine that the SCell forwards data in order to receive DL data of the SCell during a procedure for handover by the UE. Accordingly, the source PCell may transmit a data forwarding request message to the target PCell (S930). The data forwarding request message may include at least one of "a message type, an ID (PCID or ECGI) of the target PCell, an ID (PCID or ECGI) of the SCell, an ID (PCID or ECGI) of the source PCell, an ID (C-RNTI or UE X2AP ID) configured for the UE in the PCell (or SCell), and/or context information (e.g., QCI, ARP, and UE-AMBR of E-RAB) of the UE in the SCell". In addition, the aforementioned information items included in the data forwarding request message may be contained in an existing HO request message and HO request Ack message as a specific field and may be requested and transmitted.

When the target PCell and the SCell cannot form X2 connection, the target PCell requested for data forwarding may receive DL data forwarding from the SCell and allocate a DRB ID so as to forward a packet to the UE. The DRB ID may be transmitted to the UE through a RRC (re)configuration message to be described later.

Then the target PCell may allocate a X2 target PCell TEID (DL TEID of an X2 GTP tunnel) to the SCell in order to configure an X2 transmission bearer (i.e., GTP tunnel) for transmission of DL data to be forwarded to the UE by the SCell to the target PCell. The target PCell may transmit a data forwarding response message to the source PCell such that the SCell configures the X2 transmission bearer for forwarding DL data to the target PCell from the allocated X2 target PCell TEID value (S935). The data forwarding response message may include at least one of "a message type, an ID (PCID or ECGI) of the target PCell, an ID (PCID or ECGI) of the SCell, an ID (PCID or ECGI) of the source PCell, an X2 target PCell TEID, and/or an ID (C-RNTI or UE X2AP ID) configured for the UE in the PCell (or SCell).

The source PCell that receives the data forwarding response message may forward the received information to the SCell (S940). Accordingly, the SCell may configure an X2 GTP tunnel for data forwarding.

When the target PCell cannot support data forwarding to the UE, the target PCell may transmit the data forwarding failure message to the source PCell. The data forwarding failure message may include at least one of "a message type, an ID (PCID or ECGI) of the target PCell, an ID (PCID or ECGI) of the SCell, an ID (PCID or ECGI) of the source PCell, Cause (reason for data forwarding failure), and/or an ID (C-RNTI or UE X2AP ID) of the UE in the PCell (or SCell)".

Then the source PCell may transmit an RRC (re)configuration message to the UE (S945). The UE that receives the RRC (re)configuration message may recognize that the UE performs handover to the target PCell. In addition, upon receiving the RRC (re)configuration message, the UE may detach connection with the source PCell and the SCell and perform synchronization to the target PCell (S960).

In a conventional handover procedure, the source PCell may transmit a SN status transfer message to the target PCell (S950) and forward data of the source PCell to the target PCell to provide the data to the UE (S955). However, in the proposed method, in addition to this procedure, the SCell may transmit the SN status transfer message to the target PCell through an X2 interface (S965). The SN status transfer message may include a DL count value and a UL count value. Accordingly, the target PCell may recognize information about a count of a first packet to be transmitted to the UE and a count of a first packet to be received from the UE and may recognize a packet in which transmission and reception is to be started with respect to the UE.

The target PCell that receives the SN status transfer message from the SCell may receive data forwarding from the SCell (S970). Steps S975, S980, S985, S990, and S995 after S970 may be performed similarly to the conventional handover procedure described with reference to FIG. 5.

Figure 10:
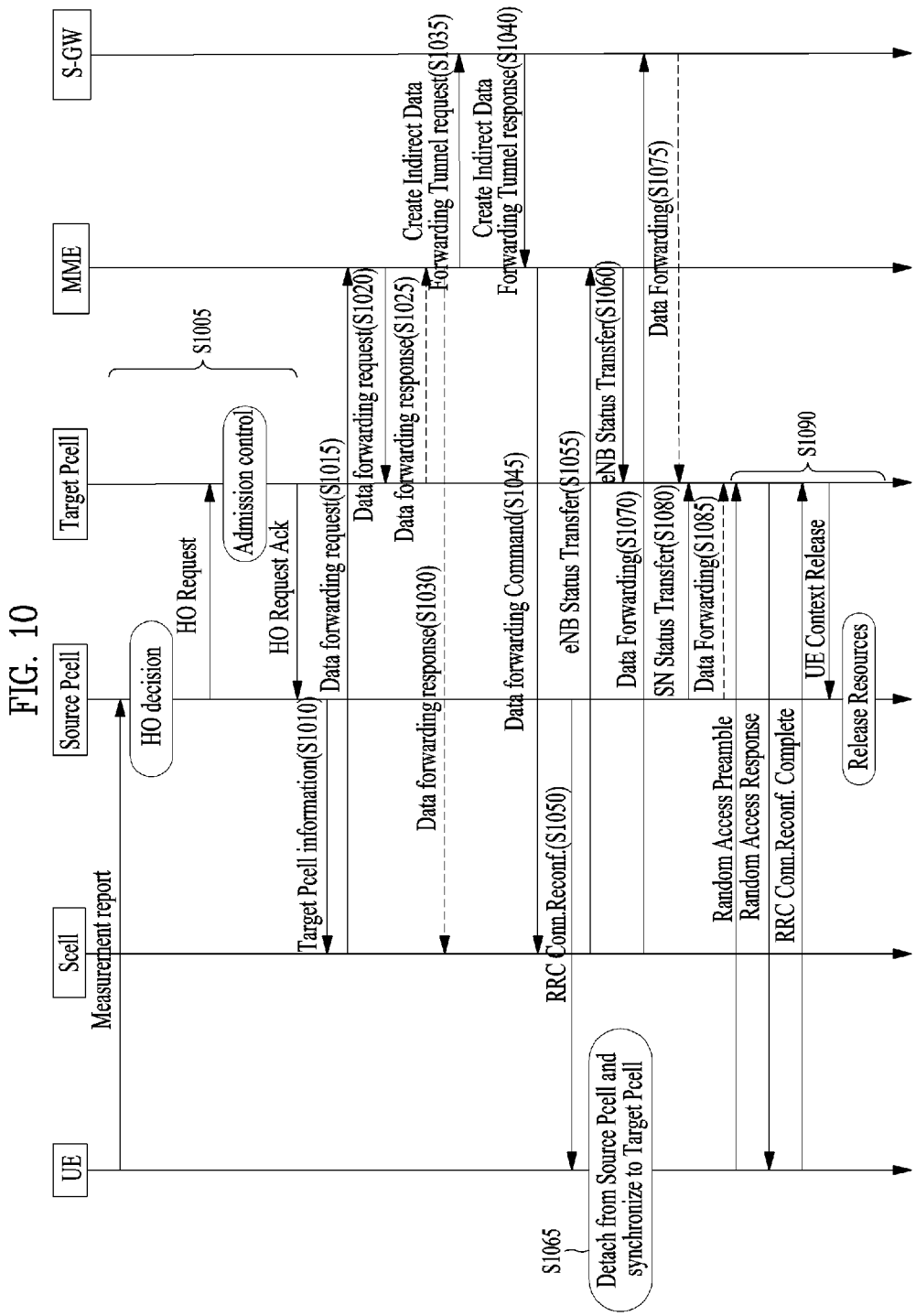
FIG. 10 is a diagram illustrating a method for transmitting DL data according to an embodiment of the present invention.

FIG. 10 is a diagram illustrating a method for transmitting DL data according to an embodiment of the present invention. As described above, when a direct bearer cannot be generated between the SCell and the target PCell, an indirect bearer may be generated using a mobility management entity (MME). FIG. 10 illustrates an embodiment in which a direct bearer is generated when a SCell requests the target PCell for data forwarding.

A procedure in which the source PCell determines handover to the target PCell by a UE based on a measurement report message from the UE may be embodied similarly to the description of FIGS. 8 and 9 (S1005). Then the source PCell may transmit a target PCell information message including at least one of "an ID (PCID or ECGI) of the source PCell, an ID (PCID or ECGI) of the SCell, ID (PCID or ECGI) information of the target PCell determined as a target of handover of the UE, an indicator indicating that handover to the target PCell is to be performed, and/or an ID (C-RNTI or UE X2AP ID) of the UE in the PCell or the SCell" to the SCell (S1010).

When the SCell cannot support dual connectivity of the UE with respect to the target PCell and the SCell, and the target PCell and the SCell cannot form X2 connection, the SCell may transmit a data forwarding request message to a MME (S1015). The data forwarding request message may include at least one of "a message type, an ID (PCID or ECGI) of the target PCell, an ID (PCID or ECGI) of the SCell, an ID (C-RNTI, SAE temporary mobile subscriber identity (S-TMSI), a MME temporary mobile subscriber identity (M-TMSI), a UE S1AP ID, a MME ID (a globally unique MME identifier (GUMMEI) or a MME identifier (MMEI)) of a UE configured in the PCell (or SCell), and/or context information (e.g., QCI, ARP, and UE-AMBR of E-RAB) of the UE in the SCell.

The MME that receives the data forwarding request message may transmit the data forwarding request message to the target PCell in order to request the UE to forward data of the SCell to the UE (S1020). The data forwarding request message may include at least one of "a message type, an ID (PCID or ECGI) of the target PCell, an ID (PCID or ECGI) of the SCell, an ID (C-RNTI, S-TMSI, M-TMSI, UE S1AP ID) and/or a MME ID (a GUMMEI or a MMEI) configured for a UE in the PCell (or SCell), and context information (e.g., QCI, ARP, and UE-AMBR of E-RAB) of the UE in the SCell".

The target PCell may configure an indirect bearer in order to receive DL data from the SCell. That is, the target PCell may allocate an S1 target PCell TEID (DL TEID of GTP tunnel with respect to the S-GW and the target PCell) such that the SCell configures an indirect bearer (GTP tunnel) to the target PCell through the S-GW. In this case, the target PCell may determine whether the indirect bearer is configured, in consideration of QoS for the UE. In addition, the target PCell that receives the data forwarding request message may generate a DRB ID and establish DRB with the UE. The DRB ID may be transmitted through an RRC (re)configuration message to be described later.

On the other hand, when the target PCell cannot satisfy QoS of the UE or cannot forward data for the UE due to an excessive load status, the target PCell may transmit a data forwarding failure message to the MME. The data forwarding failure message may include at least one of "a message type, an ID (PCID or ECGI) of the target PCell, an ID (PCID or ECGI) of the SCell, an ID (C-RNTI, S-TMSI, M-TMSI, or UE S1AP ID) and/or a MME ID (GUMMEI or MMEI) configured for the UE in the PCell (or SCell), and Cause".

The target PCell that receives the data forwarding request message and generates an indirect bearer may transmit a data forwarding response message to the MME (S1025). The data forwarding response message may include at least one of "a message type, an S1 target PCell TEID (DL TEID of GTP tunnel with respect to S-GW) allocated by the target PCell for indirect forwarding, an ID (PCID or ECGI) of the target PCell, an ID (PCID or ECGI) of the SCell, and an ID (C-RNTI, S-TMSI, M-TMSI, or UE S1AP ID) and/or MME ID (GUMMEI or MMEI) of the UE configured in the PCell (or SCell)".

The MME that receives the data forwarding response message may transmit a data forwarding response message to the SCell (S1030). The SCell may recognize that data of the SCell can be forwarded to the target PCell when an S1 bearer is configured.

In addition, the MME may transmit a create indirect data forwarding tunnel request message to the S-GW (S1035). The create indirect data forwarding tunnel request message may include at least one of "an evolved packet system (EPS) bearer ID and/or a S1 target PCell TEID (DL TEID of GTP tunnel with respect to S-GW and target PCell), a S-GW ID, and a MME ID (GUMMEI or MMEI)".

The S-GW that receives the request message may configure a DL S1 bearer for indirect data forwarding between the target PCell and the S-GW. Then the S-GW may generate an S1 TEID (UL TEID of GTP tunnel with respect to S-GW and SCell) for indirect data forwarding and transmit a create indirect data forwarding tunnel response message to the MME (S1040). The create indirect data forwarding tunnel response message may include at least one of "an S1 TEID and/or an EPS bearer ID, a MME ID (GUMMEI or MMEI), and an S-GW ID".

Then the MME may transmit a data forwarding command message to the SCell (S1045). The data forwarding command message may include at least one of "a message type, and an S1 TEID and/or a MME ID (GUMMEI or MMEI)". The SCell that receives the data forwarding command message may recognize that data of the SCell can be forwarded to the target PCell and generate a UL S1 bearer to the S-GW.

Then the source PCell may transmit a RRC (re)configuration message to the UE (S1050). The UE that receives the RRC (re)configuration message may recognize that the UE is commanded for handover to the target PCell. In addition, upon receiving an RRC (re)configuration message, the UE may detach connection with the source PCell and the SCell and perform synchronization to the target PCell (S1065).

The SCell may transmit a SN status transfer message to the MME (S1055) and the SN status transfer message may be forwarded to the target PCell from the MME (S1060). The SN status transfer message may include information such as a DL count (DL PDCP SN) and a UL count (UL PDCP SN) and the target PCell that receives the information may recognize count information of a first packet to be transmitted and received with respect to the UE. UL count information may be omitted from the SN status transfer message.

Then the SCell may transmit a DL packet to the target PCell through the S-GW using an indirect bearer (S1070 and S1075). The target PCell that receives the DL packet may transmit the DL packet to the UE connected to the target PCell.

Steps S1080 and S1085 for transmitting the SN status transfer message to the target PCell by the source PCell and forwarding DL data and step S1090 after random access may be embodied similarly to the description of FIGS. 8 and 9.

Figure 11:
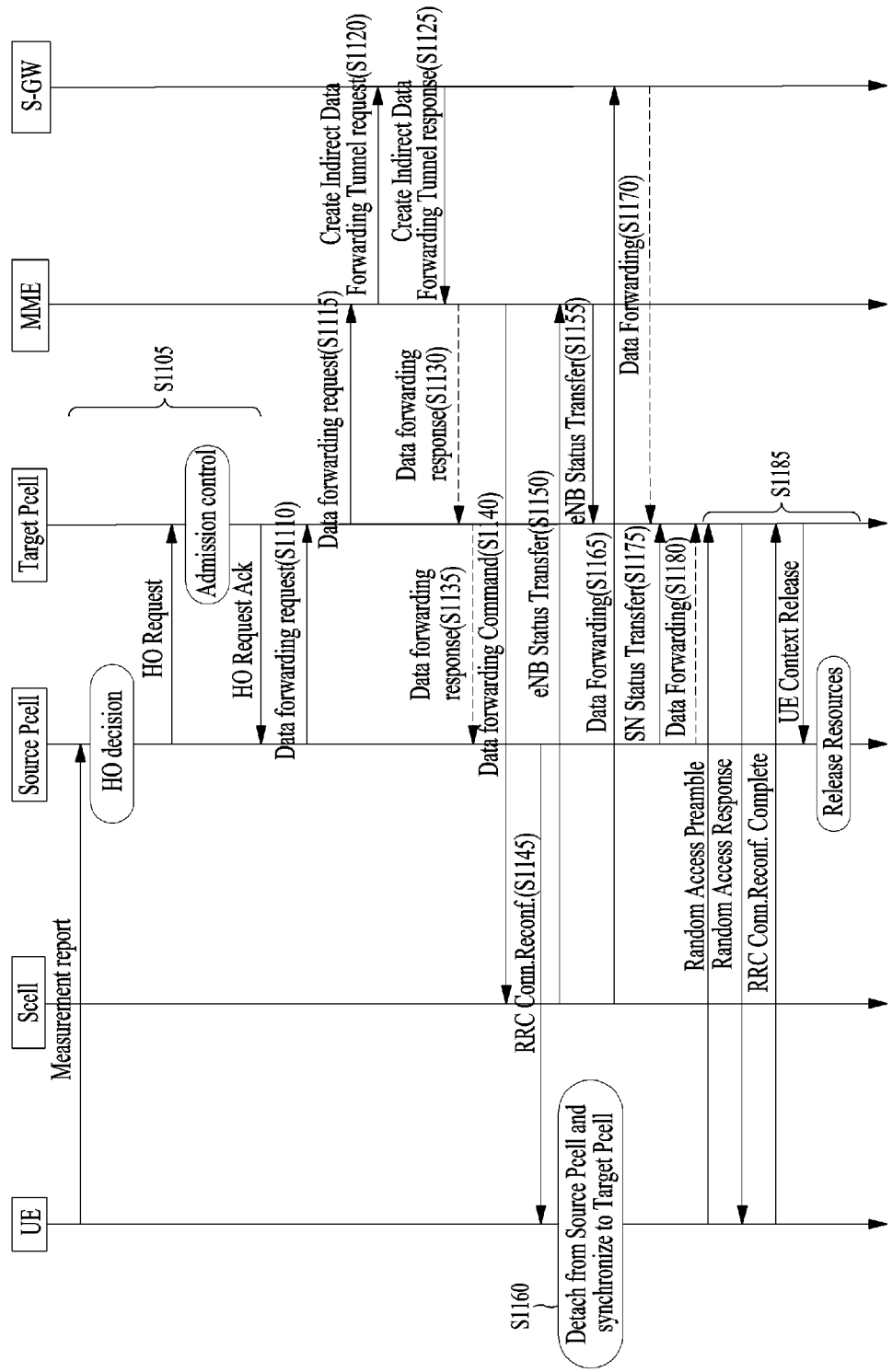
FIG. 11 is a diagram illustrating a method for transmitting DL data according to an embodiment of the present invention.

FIG. 11 is a diagram illustrating a method for transmitting DL data according to an embodiment of the present invention. FIG. 11 illustrates an embodiment in which an indirect bearer is generated when the source PCell requests a target PCell for data forwarding. In FIG. 11, repeated descriptions of elements already described in FIG. 10 will not be given here.

A procedure in which the source PCell determines handover to the target PCell by a UE based on a measurement report message from the UE may be performed similarly to the conventional handover procedure described with reference to FIGS. 8 and 9 (S1105).

Then when the target PCell and the SCell cannot support dual connectivity of the UE, the source PCell may determine to forward data of the SCell to the target PCell and transmit a data forwarding request message to the target PCell (S1110). The data forwarding request message may include at least one of "a message type, an ID (PCID or ECGI) of the target PCell, an ID (PCID or ECGI) of the SCell, an ID (C-RNTI or UE X2AP ID) configured for the UE in the PCell (or SCell), and/or context information (e.g., QCI, ARP, and UE-AMBR of E-RAB) of the UE in the SCell". In addition, the aforementioned information items included in the data forwarding request message as a specific field and may be requested and transmitted.

When the target PCell and the SCell cannot form X2 connection, the target PCell may configure an indirect bearer in order to receive DL data from the SCell. That is, the target PCell may allocate an S1 target PCell TEID (DL TEID of GTP tunnel with respect to a S-GW and a target PCell) such that the SCell configures an indirect bearer (GTP tunnel) to the target PCell through a S-GW. In this case, the target PCell may determine whether an indirect bearer (GTP tunnel) is configured, in consideration of QoS of the UE.

In addition, the target PCell that receives the data forwarding request message may generate a DRB ID and form a DRB with the UE using the DRB ID. The DRB ID may be transmitted through the RRC (re)configuration message.

When the target PCell cannot satisfy the QoS of the UE or cannot forward data of the SCell to the UE, the target PCell may transmit a data forwarding failure message to the source PCell or the MME. The data forwarding failure message may include at least one of "a message type, an ID (PCID or ECGI) of the target PCell, an ID (PCID or ECGI) of the SCell, Cause (reason for data forwarding failure), and an ID (C-RNTI, UE X2AP ID, or UE S1AP ID) and/or a MME ID (GUMMEI or MMEI) of the UE configured in the PCell (or SCell)".

The target PCell that receives the data forwarding request message and determines to generate an indirect bearer may transmit a data forwarding request message to the MME (S1115). The data forwarding request message may include at least one of "a message type, an S1 target PCell TEID (DL TEID of a GTP tunnel with respect to a S-GW and a target PCell), and an ID (C-RNTI or UE X2AP ID in the PCell or the SCell, UE S1AP ID, or the like) and/or a MME ID (GUMMEI or MMEI) of the UE".

The MME may transmit a create indirect data forwarding tunnel request message to the S-GW (51120). The create indirect data forwarding tunnel request message may include at least one of "an EPS bearer ID and/or an S1 target PCell TEID (a DL TEID of a GTP tunnel with respect to a S-GW and a target PCell)".

The S-GW that receives the request message may configure a DL S1 bearer for indirect data forwarding between the target PCell and the S-GW. Then the S-GW may generate a S1 TEID (UL TEID of a GTP tunnel with respect to a S-GW and a SCell) for indirect data forwarding and transmit a create indirect data forwarding tunnel response message to the MME (S1125). The create indirect data forwarding tunnel response message may include at least one of "S1 TEID and/or EPS bearer ID".

The MME may transmit a data forwarding response message to the SCell through the target PCell or directly (S1130). The SCell may recognize that data of the SCell can be forwarded to the target PCell when an S1 bearer is configured. In addition, the MME may transmit a data forwarding command message to the SCell (S1140). The data forwarding command message may include at least one of "a message type and/or an S1 TEID (a UL TEID of a GTP tunnel with respect to a S-GW and a SCell)".

The SCell that receives the data forwarding command message may recognize that data can be forwarded to the target PCell and may generate a UL S1 bearer to the S-GW.

The same or similar to the description of FIG. 10 may be applied to steps S1145 and S1150 to S1185 which are not directly described with reference to FIG. 11.

Figure 12:
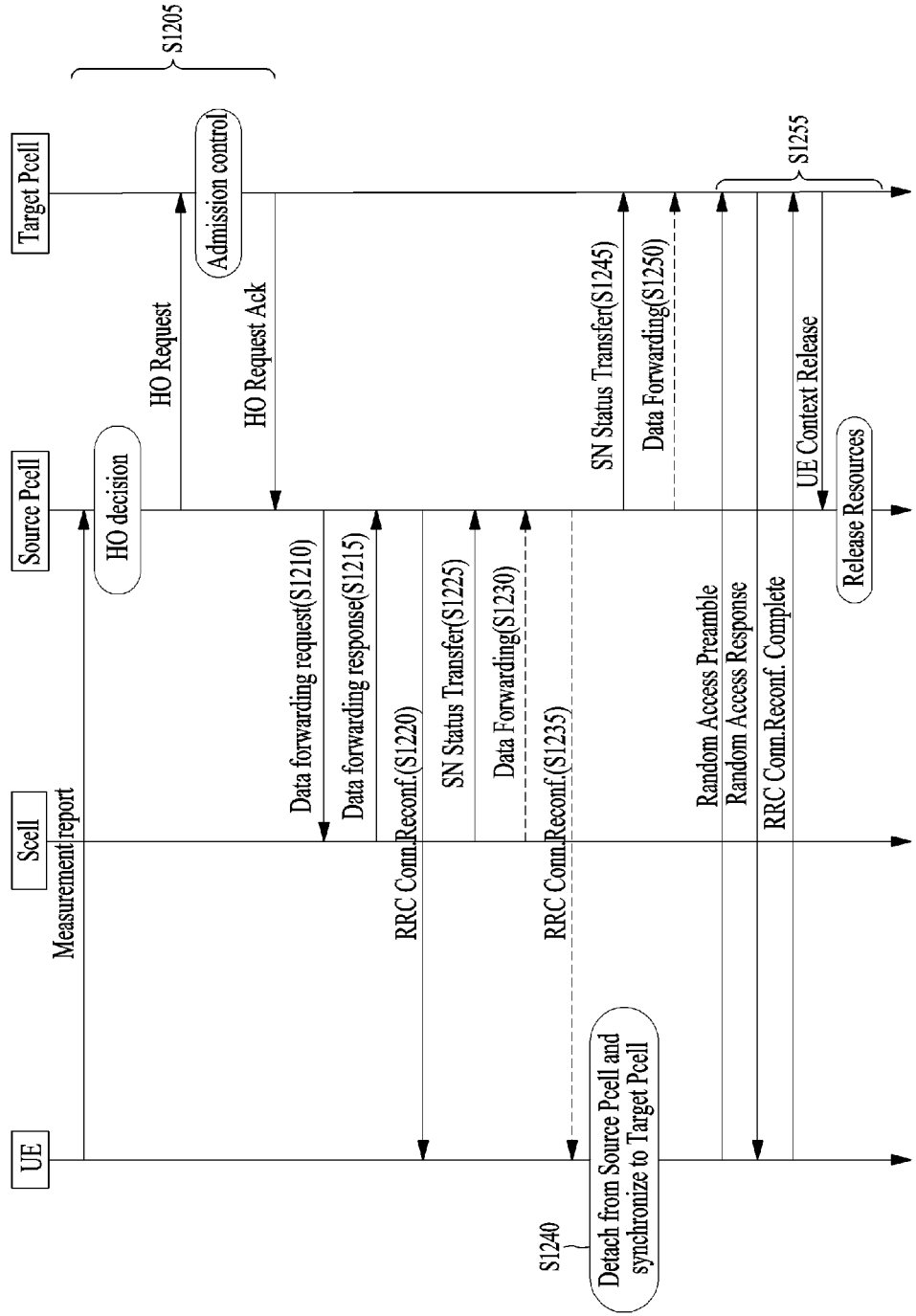
FIG. 12 is a diagram illustrating a method for transmitting DL data according to an embodiment of the present invention.

FIG. 12 is a diagram illustrating a method for transmitting DL data according to an embodiment of the present invention. FIGS. 12 to 15 illustrate an embodiment in which a direct/indirect bearer for data forwarding of a SCell is generated between a SCell and a source PCell, and FIG. 12 illustrates an embodiment in which the direct bearer is generated when the source PCell requests data forwarding.

The source PCell may determine that a UE performs handover to the target PCell according to a measurement report message from the UE (S1205). The description of FIGS. 8 to 11 may be applied in a similar way to the procedure for determining handover.

Compared to FIGS. 8 to 11, in FIGS. 12 to 15, DL data of the SCell is forwarded to the source PCell. That is, the SCell and the target PCell cannot support dual connectivity of the UE, the source PCell instead of the SCell may forward DL data of the SCell to the UE.

The source PCell may determine to forward DL data of the SCell such that the UE continuously receives a DL data packet received from the SCell. That is, the source PCell may determine to forward DL data of the SCell so as to receive DL data before the UE detaches connection from the source PCell or to receive DL data forwarding when the source PCell is connected to the target PCell after being detached from the source PCell.

Accordingly, the source PCell may transmit a data forwarding request message for requesting data forwarding of the SCell to the source PCell, to the SCell (S1210). The data forwarding request message may include at least one of "a message type, an ID (PCID or ECGI) of the target PCell, an ID (PCID or ECGI) of the SCell, and/or an ID (C-RNTI or UE X2AP ID) configured for the UE in the PCell (or SCell)".

In addition, the source PCell may command the SCell to configure an X2 transmission bearer (GTP tunnel) in order to receive DL data from the SCell. That is, the source PCell may allocate an X2 source PCell TEID (DL TEID of an X2 GTP tunnel) to the SCell, may contain the X2 source PCell TEID to a data forwarding request message, and may transmit the data forwarding request message.

When the source PCell and the SCell cannot form X2 connection, the source PCell may allocate a DRB ID between the source PCell and the SCell in order to forward a DL data packet to the UE. The DRB ID may be transmitted to the UE through a RRC (re)configuration message to be described later.

The SCell may transmit a data forwarding response message to the source PCell so as to configure an X2 transmission bearer for forwarding DL data from the X2 source PCell TEID value to the target PCell (S1215). The data forwarding response message may include at least one of "a message type, an ID (PCID or ECGI) of the target PCell, an ID (PCID or ECGI) of the SCell, an X2 target PCell TEID, an ID (C-RNTI or UE X2AP ID) of the UE in the PCell (or SCell), and/or context information (e.g., QCI, ARP, and UE-AMBR of E-RAB) of the UE in the SCell". The source PCell that receives the data forwarding response message may configure an X2 GTP tunnel for DL data forwarding.

Then the source PCell may transmit a RRC (re)configuration message to the UE (S1220) and the UE may recognize that the UE performs handover to the target PCell. In addition, upon receiving the RRC (re)configuration message, the UE may detach connection with the source PCell and the SCell and perform synchronization to the target PCell (S1240).

In a conventional handover procedure, the source PCell may transmit a SN status transfer message to the target PCell and forward data of the source PCell to the target PCell provide the data to the UE (S1245). However, in the proposed method, in addition to this procedure, the SCell may forward data of the SCell to the source PCell and the source PCell may provide data of the SCell to the UE. In addition, when the source PCell cannot completely transmit the data of the SCell, the data of the SCell may also be forwarded when data of the source PCell is forwarded to the target PCell. The SCell may transmit a SN status transfer message to the source PCell through an X2 interface (S1225). The SN status transfer message may include a DL count value and a UL count value. Accordingly, the source PCell may recognize a count of a first packet to be transmitted to the UE and a count of a first packet to be received from the UE and may recognize a packet in which transmission and reception is to be started with respect to the UE. The source PCell that receives the SN status transfer message from the SCell may receive data forwarding from the SCell (S1230). Step S1255 after S1230 may be performed in a similar way to the conventional handover procedure described with reference to FIGS. 8 to 11.

Figure 13:
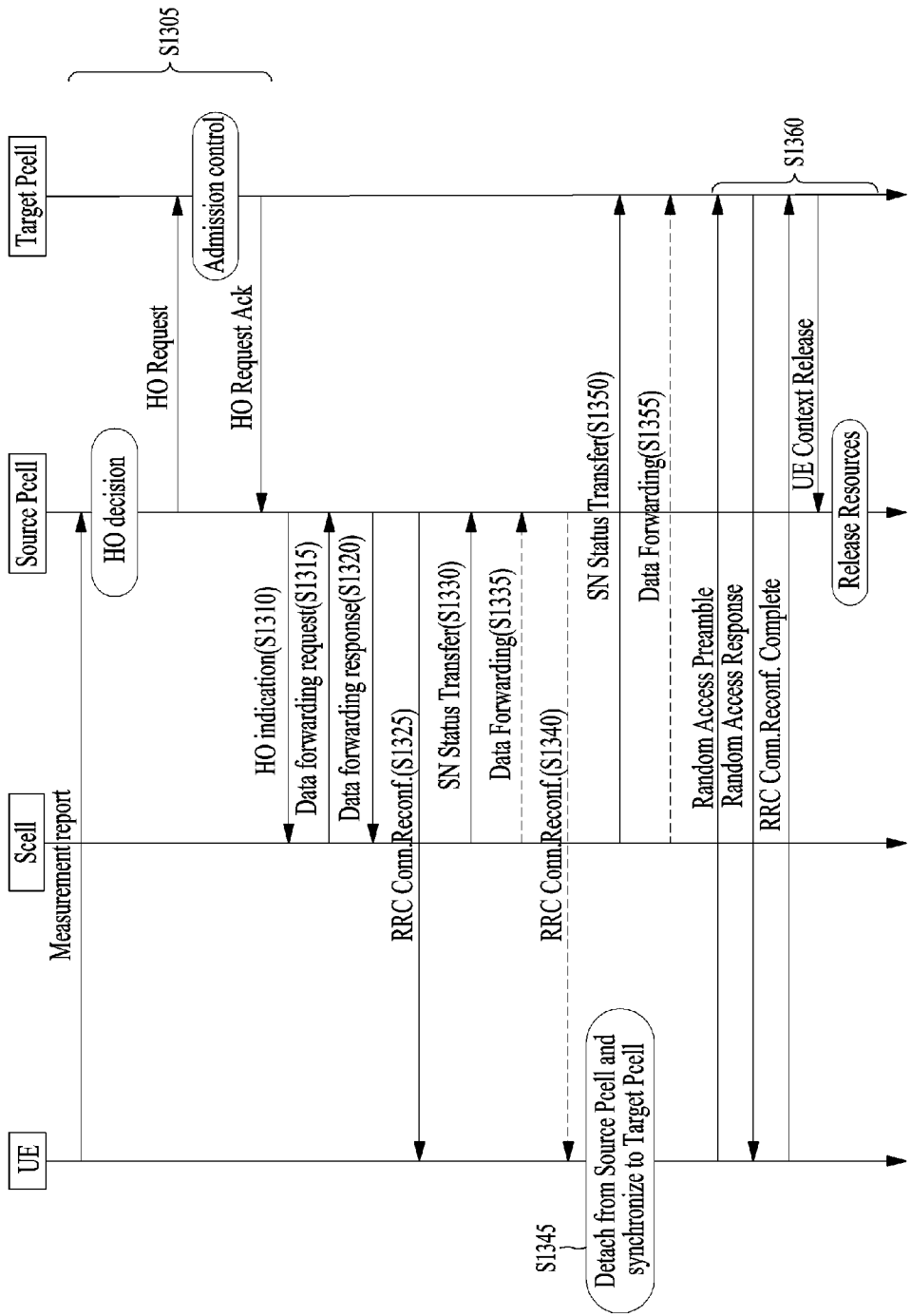
FIG. 13 is a diagram illustrating a method for transmitting DL data according to an embodiment of the present invention.

FIG. 13 is a diagram illustrating a method for transmitting DL data according to an embodiment of the present invention. FIG. 13 illustrates an embodiment in which a direct bearer is generated when a SCell requests a source PCell for data forwarding. In FIG. 13, repeated descriptions of elements already described in FIG. 12 will not be given here.

Upon determining handover of the UE, the source PCell may transmit a handover indicator message to the SCell (S1310). The handover indicator message may include at least one of "PCID or ECGI information about the target PCell, PCID or ECGI information about the source PCell, an indicator indicating handover to the target PCell, and/or an ID (C-RNTI or UE X2AP ID) of the UE".

When the SCell that receives the handover indicator message determines data forwarding to the UE that performs handover, the SCell may transmit a data forwarding request message indicating that data of UE is to be forwarded to the target PCell, to the source PCell (S1315). The data forwarding request message may include at least one of "a message type, an ID (PCID or ECGI) of the target PCell, an ID (PCID or ECGI) of the SCell, an X2 source PCell TEID, an ID (C-RNTI or UE X2AP ID) of the UE in the PCell (or SCell), and/or context information (e.g., QCI, ARP, and UE-AMBR of E-RAB) of the UE in the SCell".

When X2 connection between the source PCell and the SCell can be formed, the source PCell may allocate a DRB ID between the source PCell and the SCell for DL data forwarding of the UE through the source PCell. The DRB ID may be transmitted through a RRC (re)configuration message.

The source PCell may allocate an X2 source PCell TEID (a DL TEID of an X2 GTP tunnel) such that the SCell configures an X2 transmission bearer (GTP tunnel) in order to receive DL data received from the SCell. The source PCell may transmit a data forwarding response message to the SCell such that the SCell configures an X2 transmission bearer from the X2 source PCell TEID value (S1320). The data forwarding response message may include at least one of "a message type, an ID (PCID or ECGI) of a target PCell, an ID (PCID or ECGI) of the SCell, an X2 target PCell TEID, and/or an ID (C-RNTI or UE X2AP ID) of the UE in the PCell (or SCell)".

The SCell that receives the data forwarding response message may configure an X2 GTP tunnel for data forwarding and subsequent steps S1325 to S1360 may be embodied in a similar way to FIG. 11.

Figure 14:
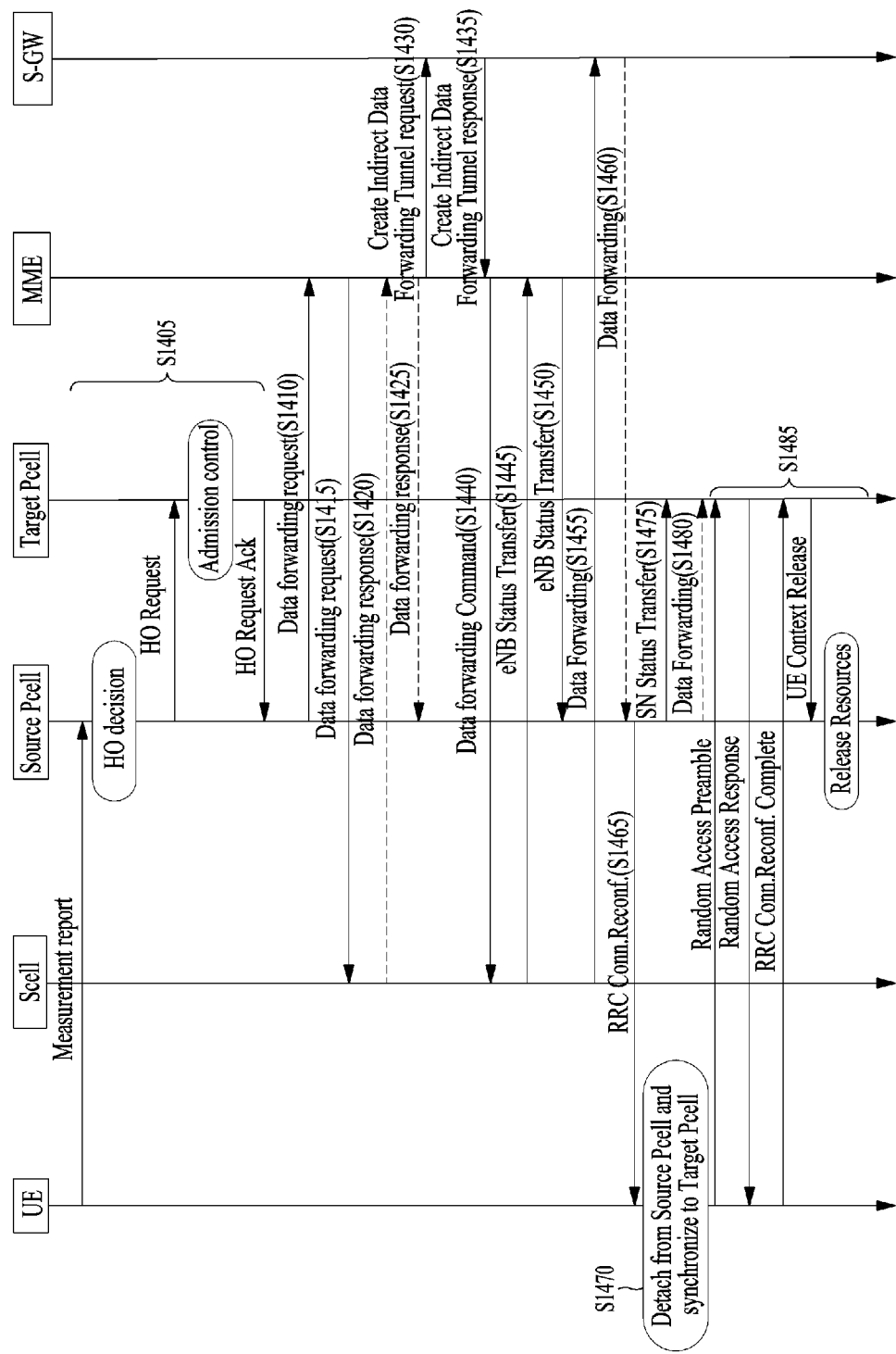
FIG. 14 is a diagram illustrating a method for transmitting DL data according to an embodiment of the present invention.

FIG. 14 is a diagram illustrating a method for transmitting DL data according to an embodiment of the present invention. FIG. 14 illustrates an embodiment in which an indirect bearer is generated when a source PCell requests data forwarding.

The source PCell may determine handover to the target PCell based on the measurement report message of the UE (S1405). When the source PCell and the SCell cannot form X2 connection, the source PCell may transmit a data forwarding request message for request for DL data forwarding of the SCell to the source PCell, to the MME (S1410). The data forwarding request message may include at least one of "a message type, an ID (PCID or ECGI) of the target PCell, an ID (PCID or ECGI) of the SCell, an ID (PCID or ECGI) of the source PCell, and/or an ID (C-RNTI or UE X2AP ID, S-TMSI, M-TMSI, UE S1AP ID) and MME ID (GUMMEI or MMEI) configured for the UE in the PCell (or SCell)".

The source PCell may allocate an S1 source PCell TEID (DL TEID of a GTP tunnel with respect to a S-GW and a source PCell) such that the SCell configures an indirect bearer (GTP tunnel) through the S-GW in order to receive DL data from the SCell. In this case, the source PCell may determine whether an indirect bearer is configured in consideration of QoS of the UE. In addition, the source PCell may generate a DRB ID and form a DRB with the UE, and the DRB ID may be forwarded through a RRC (re)configuration message to be described later.

The MME that receives the data forwarding request message may transmit a data forwarding request message to the SCell (S1415). The data forwarding request message may include at least one of "a message type, an S1 source PCell TEID (DL TEID of a GTP tunnel with respect to a S-GW and a source PCell) allocated by the source PCell for indirect forwarding and/or a message type, an ID (PCID or ECGI) of the target PCell, an ID (PCID or ECGI) of the SCell, an ID (PCID or ECGI) of the source PCell and/or an ID (C-RNTI or UE X2AP ID, S-TMSI, M-TMSI, or UE S1AP ID) and MME ID (GUMMEI or MMEI) configured for the UE in the PCell (or SCell)".

The SCell that receives the data forwarding request message from the MME may transmit a data forwarding response message to the source PCell through the MME in response to the data forwarding request message (S1420 and S1425).

The MME that receives the data forwarding request message from the source PCell or receives the data forwarding response message from the SCell may transmit a create indirect data forwarding tunnel request message to the S-GW (S1430). The create indirect data forwarding tunnel request message may include at least one of "a EPS bearer ID and/or an S1 source PCell TEID (a DL TEID of a GTP tunnel with respect to the S-GW and the source PCell)".

The S-GW that receives the request message may configure a DL S1 bearer for indirect data forwarding between the source PCell and the S-GW. Then the S-GW may generate an S1 TEID (a UL TEID of a GTP tunnel with respect to the S-GW and the SCell) for indirect data forwarding and transmit the create indirect data forwarding tunnel response message to the MME (S1435). The create indirect data forwarding tunnel response message may include at least one of "an S1 TEID and/or an EPS bearer ID".

Then the MME may transmit a data forwarding command message to the SCell (S1440). The data forwarding command message may include at least one of "a message type and/or an S1 TEID". The SCell that receives the data forwarding command message may recognize that data of the SCell can be forwarded to the target PCell and generate a UL S1 bearer to the S-GW.

The SCell that receives the data forwarding command message may transmit a SN status transfer message to the MME (S1445). The SN status transfer message may include information about a DL count and UL count. The MME may transmit the received SN status transfer message to the source PCell (S1450) and the source PCell may recognize information about a count of a first packet to be transmitted by the UE and a count of a first packet to be transmitted to the UE (the UL count information may be omitted).

After the SCell transmits the SN status transfer message to the source PCell through the MME, the SCell may transmit a DL packet to the source PCell through the S-GW using an indirect bearer (S1455 and S1460). The source PCell may transmit the DL data received from the SCell, to the UE. Subsequent steps S1465 to S1485 may be embodied similarly to FIG. 11.

Figure 15:
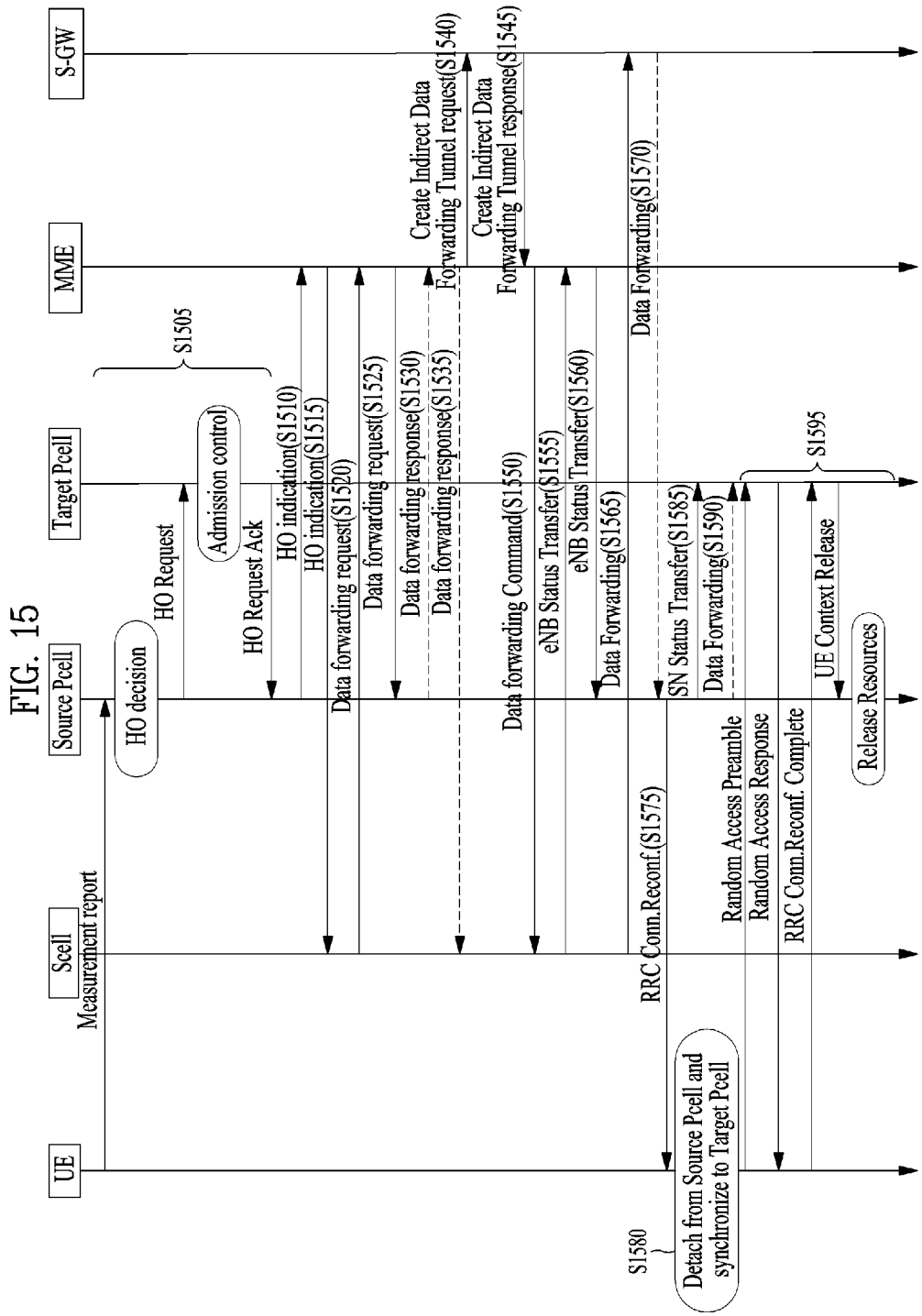
FIG. 15 is a diagram illustrating a method for transmitting DL data according to an embodiment of the present invention.

FIG. 15 is a diagram illustrating a method for transmitting DL data according to an embodiment of the present invention. FIG. 15 illustrates an embodiment in which an indirect bearer is generated when a SCell requests a source PCell for data forwarding. In FIG. 15, repeated descriptions of elements already described in FIG. 14 will not be given here.

The source PCell may transmit a handover indication message to the SCell through a MME allocated to the UE (S1510 and S1515). The handover indication message may include at least one of "a message type, PCID or ECGI information about the target PCell, PCID or ECGI information about the source PCell, an ID (PCID or ECGI) of the SCell, an indicator indicating handover to the target PCell, and/or an ID (C-RNTI or UE X2AP ID, S-TMSI, M-TMSI, or UE S1AP ID) and a MME ID (GUMMEI or MMEI) of the UE".

When the source PCell and the SCell cannot form X2 connection directly, the SCell may transmit a data forwarding request message to the MME (S1520). The data forwarding request message may include at least one of "a message type, an ID (PCID or ECGI) of the target PCell, an ID (PCID or ECGI) of the SCell, an ID (PCID or ECGI) of the source PCell, an ID (C-RNTI or UE X2AP ID, S-TMSI, M-TMSI, or UE S1AP ID) of the UE in the PCell (or SCell), context information (e.g., QCI, ARP, and UE-AMBR of E-RAB) of the UE in the SCell, and MME ID (GUMMEI or MMEI)".

The MME that receives the data forwarding request message may forward a data forwarding request message to the source PCell (S1525). Then the source PCell may allocate a S1 source PCell TEID (a DL TEID of a GTP tunnel with respect to a S-GW and a source PCell) such that the SCell configures an indirect bearer (GTP tunnel) to the source PCell through the S-GW in order to receive DL data about the UE from the SCell.

The source PCell may generate a DRB ID and form a DRB with the UE, and the DRB ID may be transmitted to the UE through a RRC (re)configuration message. In addition, the source PCell may transmit a data forwarding response message to the SCell through the MME (S1530 and S1535). The data forwarding response message may include at least one of "a message type, an ID (PCID or ECGI) of the target PCell, an ID (PCID or ECGI) of the SCell, an ID (PCID or ECGI) of the source PCell, an ID (C-RNTI or UE X2AP ID, S-TMSI, M-TMSI, or UE S1AP ID) and MME ID (GUMMEI or MMEI) of the UE in the PCell (or SCell)". The same or similar to the description of FIG. 14 may be applied to subsequent steps S1540 to S1595.

The bearer configuring method of the SCell, the target PCell, and the source PCell, which has been described above with reference to FIGS. 8 to 15, may be applied irrespective of a bearer configuring method of each of the source PCell and the target PCell. In addition, although the case in which X2 handover between the source PCell and the target PCell is performed has been described above, this is purely exemplary and thus may be applied irrespective of a handover method of the source PCell and the target PCell.

FIG. 16 is a diagram illustrating a method for transmitting DL data according to an embodiment of the present invention. FIGS. 16 and 17 illustrate an embodiment in which a data path to be transmitted to a SCell is switched to a target PCell, and FIG. 16 illustrates an embodiment in which a path is switched by the SCell.

The description of FIGS. 8 to 15 may be applied in a similar way to step S1605 in which the source PCell determines handover of the UE to the target PCell. The source PCell may transmit information about the target PCell to which handover is performed by the UE to the SCell through the data forwarding information message (S1610). The data forwarding information message may include at least one of "a message type, an ID (C-RNTI or UE X2AP ID) of the UE in the PCell (or SCell), PCID or ECGI of the target PCell and/or PCID or ECGI of the SCell".

The SCell that receives the data forwarding information message may recognize that DL data of the SCell is forwarded to the target PCell and the SCell may transmit the data forwarding request message to the target PCell (S1615). The data forwarding request message may include at least one of "a message type, PCID or ECGI of the SCell, PCID or ECGI of the target PCell, context information (QCI, ARP, and UE-AMBR of E-RAB) for the UE in the SCell, and/or an ID (C-RNTI or UE X2AP ID) of the UE in the PCell (or SCell)". The target PCell that receives the data forwarding request message may generate a DRB ID for the UE and form a DRB for the UE.

The target PCell may transmit a data forwarding failure message to the SCell when the target PCell cannot ensure QoS of the UE in consideration of the context information included in the data forwarding request message. The data forwarding failure message may include at least one of "a message type, PCID or ECGI of the target PCell, PCID or ECGI of the SCell, Cause (the reason for data forwarding failure), and/or an ID (C-RNTI or UE X2AP ID) of the UE in the PCell (or SCell)".

When the target PCell can support the UE and thus a DRB is formed, the target PCell may transmit a data forwarding response message to the SCell (S1620). Accordingly, the SCell may recognize that the target PCell performs data forwarding of the SCell.

Then, after determining data forwarding for the SCell, the target PCell may transmit a path switch request message for switching a path of a S1 bearer to the MME in order to forward DL data of the SCell to the UE (S1625). The path switch request message may include at least one of "a message type, information (a S1 target PCell TEID or ERAB ID allocated to generate a DL S1 bearer from the S-GW by the target PCell) for switching of E-RAB in DL, an E-UTRAN cell global identifier (ECGI), a tracking area indicator (TAI) and an MME ID (GUMMEI or MMEI) of the target PCell, and/or an ID (C-RNTI or UE S1AP ID) of the UE".

A subsequent procedure may be embodied in a similar way to a path switch request procedure of an EPS bearer in handover. That is, the MME may transmit a mobility bearer request message to a P-GW through a S-GW (S1630 and S1635) and the P-GW may transmit a mobility bearer response message to the MME through the S-GW (S1640 and S1645). In addition, the MME may transmit a path switch request Ack message to the target PCell (S1650). The path switch request Ack message may include at least one of "a message type, PCID or ECGI of the SCell, PCID or ECGI of the target PCell, and/or an ID (C-RNTI or UE S1AP ID) of the UE".

FIG. 17 is a diagram illustrating a method for transmitting DL data according to an embodiment of the present invention. In FIG. 17, repeated descriptions of elements already described in FIG. 16 will not be given here.

When a source PCell manages control information about a SCell and a UE, the source PCell may transmit a data forwarding request message to the target PCell in order to forward information of the SCell to the target PCell (S1710). The data forwarding request message may include at least one of "a message type, a PCID or ECGI of the source PCell, PCID or ECGI of the SCell, PCID or ECGI of the target PCell, context information (QCI, ARP, and UE-AMBR of E-RAB) for the UE, and/or an ID (C-RNTI or UE X2AP ID) of the UE".

The target PCell may generate a DRB ID and form a DRB for the UE. When the target PCell can ensure QoS of the UE and may form a DRB, the target PCell may forward a data forwarding response message to the source PCell (S1715). On the other hand, when the target PCell cannot ensure QoS of the UE and cannot support data forwarding, the target PCell may transmit a data forwarding failure message to the source PCell. The data forwarding failure message may include at least one of "a message type, PCID or ECGI of the target PCell, PCID or ECGI of the SCell, PCID or ECGI of the source PCell, Cause (the reason for forwarding failure), and/or an ID (C-RNTI or UE X2AP ID) of the UE in the PCell (or SCell)".

The source PCell that receives the data forwarding response message may recognize that the target PCell can forward data of the SCell. Then the target PCell may switch a path of an S1 bearer in order to switch a path for receiving DL data from the SCell by the UE to the target PCell. That is, the target PCell may transmit a path switch request message to the MME (S1720). The path switch request message may include at least one of "a message type, information (S1 target PCell TEID or ERAB ID allocated to generate a DL S1 bearer from the S-GW by the target PCell) for switching of E-RAB in DL, ECGI, TAI, and MME ID (GUMMEI or MMEI) of the target PCell, and/or ID (C-RNTI or UE S1AP ID) of the UE".

Subsequent steps S1725 to S1745 may be embodied in a similar way to S1630 to S1650 of FIG. 16.

FIG. 18 is a diagram illustrating a method for transmitting DL data according to an embodiment of the present invention. FIG. 18 illustrates an embodiment in which a data path to be transmitted to a SCell is switched to a source PCell. In FIG. 18, repeated descriptions of elements already described in FIGS. 16 and 17 will not be given here.

The source PCell may determine handover of the UE to the target PCell (S1805) and transmit a handover indicator message to the UE (S1810). The SCell may transmit a data forwarding request message to the source PCell in order to forward data of the SCell to the source PCell (S1815). The data forwarding request message may include at least one of "a message type, PCID or ECGI of the SCell, PCID or ECGI of the source PCell, context information (QCI, ARP, and UE-AMBR of E-RAB) for the UE in the SCell, and/or an ID (C-RNTI or UE X2AP ID) of the UE in the PCell (or SCell)".

The source PCell may generate a DRB ID for the UE and form a DRB for the UE. When the source PCell cannot ensure QoS of the UE and can form a DRB, the source PCell may transmit a data forwarding response message to the SCell (S1820). On the other hand, when the source PCell cannot support the QoS of the UE in consideration of QCI and ARP of the E-RAB, the source PCell may transmit a data forwarding failure message to the SCell. The data forwarding failure message may include at least one of "a message type, PCID or ECGI of the source PCell, PCID or ECGI of the SCell, Cause (the reason for data forwarding failure), and/or an ID (C-RNTI or UE X2AP ID) of the UE in the PCell (or SCell)".

When the source PCell determines to transmit data for the SCell, the source PCell may transmit a path of the S1 bearer such that the UE receives DL data forwarding received from the SCell. That is, the source PCell may transmit a path switch request message to the MME (S1825). The path switch request message may include at least one of "a message type, information (S1 source PCell TEID or ERAB ID allocated to generate a DL S1 bearer from the S-GW by the source PCell) for switching of E-RAB in DL, ECGI, tracking area indicator (TAI), and MME ID (GUMMEI or MMEI) of the source PCell, and/or an ID (C-RNTI or UE S1AP ID) of the UE".

The description of FIGS. 16 and 17 may be applied in a similar way to subsequent steps S1830 to S1850.

Figure 19:
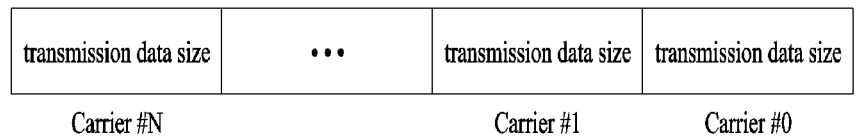
FIG. 19 is a diagram illustrating a method for transmitting DL data according to an embodiment of the present invention.

FIG. 19 is a diagram illustrating a method for transmitting DL data according to an embodiment of the present invention.

In the legacy LTE and LTE-A, a UE transmits UE buffer status report to a serving eNB of the UE using a MAC control element. In this case, when the serving eNB of the UE performs carrier aggregation, the serving eNB may schedule a plurality of CCs using one scheduler. Thus, the serving eNB may allocate the amount of resource required by the UE according to a buffer status of the UE.

However, in a cell deployment in which a macro cell and a small cell coexist, when the UE has dual connectivity with respect to a macro cell and a small cell, the macro cell (PCell) and the small cell (SCell) uses different schedulers.

That is, the UE may manage data transmitted through each CC using separate buffers and may manage how data stored in one buffer is transmitted through each CC. Hereinafter, a method for managing a buffer status of a UE having dual connectivity with respect to the macro cell and the small cell with separated schedulers will be described below.

As a first method, when a UE generates a control plane using only a PCell, the UE may determine how data stored in a buffer is transmitted according to a type of data (e.g., real-time data or non-real time data) to be transmitted or channel state information (CSI) of each CC. That is, the UE may determine how data stored in one buffer is divided and transmitted through each CC and transmit information about the size of data to be transmitted for each CC to the PCell using a MAC control element.

With regard to the embodiment illustrated in FIG. 19, when N CCs are configured for the UE, the UE may determine the amount of resources desired to be allocated by each CC. The UE may transmit the determined amount of resources and information about the data size to the PCell using an illustrated format, and the PCell may notify each cell of the received information.

As a second method, when the UE generates a control plane using only a PCell, the UE may transmit information about the size of information stored in one buffer to the PCell using a MAC control element. The PCell may determine the remaining data size except for the data size to be allocated to the UE by the PCell from the transfer data size stored in the buffer of the UE. Then the PCell may transmit the information about the already determined remaining data size to SCells that can allocate resources for the UE.

In addition, the PCell may determine the size of data to be transmitted to each SCell by the UE in consideration of CSI between the UE and the SCell, a type of data to be transmitted by the UE, load information of the SCell, and so on. Information about the determined data size may be transmitted through backhaul between the PCell and the SCell.

As a third method, a UE may determine how data stored in one buffer is divided and transmitted through each CC. In addition, the UE may transmit a buffer status report message to each cell to notify the amount of resources allocated to each cell. Accordingly, the UE may transmit a physical uplink control channel (PUCCH) to each cell in order to scheduling report (SR). Each cell that receives the buffer status report message from the UE may each perform scheduling and allocate a resource for the UE.

Figure 20:
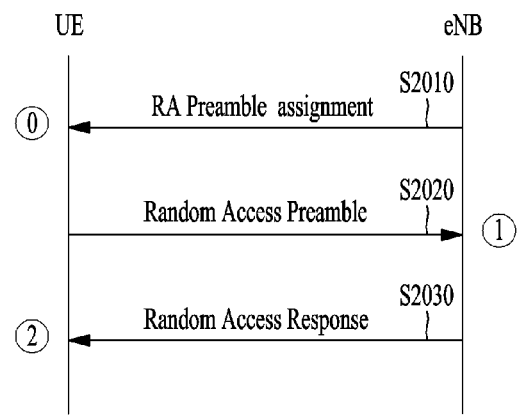
FIG. 20 is a diagram illustrating a method for transmitting DL data according to an embodiment of the present invention.

FIG. 20 is a diagram illustrating a method for transmitting DL data according to an embodiment of the present invention.

When a UE knows information about a SCell configured for the UE through a RRC (re)configuration message, the UE that receives an activation message of the SCell from a PCell can transmit and receive data to and from the SCell by performing a random access procedure to the SCell. In this case, in the legacy LTE-A, a UE uses the same C-RNTI with respect to all serving cells of the UE and performs non-contention based random access.

In the legacy LTE-A, since a PCell and a SCell are positioned in the same eNB, there is no problem in performing random access of a secondary timing alignment group (sTAG). However, when the UE has dual connectivity, there is a problem in that the macro cell and the small cell are supported by different eNBs.

Random access preamble assignment can be transmitted in a cell in which the SCell can be scheduled (S2010). That is, when the PCell and the SCell perform cross scheduling, the PCell may transmit a PDCCH order for the random access preamble assignment. Conventionally, when the PCell aligns a random access preamble, the SCell may also recognize a preamble aligned for the UE. Accordingly, when the UE transmits the aligned preamble to the SCell, the SCell may also detect the preamble aligned to the UE (S2020 and S2030).

However, when the PCell and the SCell are positioned in different eNBs, the SCell cannot detect the preamble aligned to the UE in the PCell. Accordingly, when the UE aligned with the preamble transmits a preamble to the SCell, the SCell cannot accurately the preamble. In addition, even if the SCell detects and detects a corresponding preamble, the PCell cannot confirm whether the corresponding preamble is the preamble aligned to the UE. Accordingly, there is a problem in that the UE cannot accurately perform a procedure for acquiring UL synchronization of the SCell.

Figure 21:
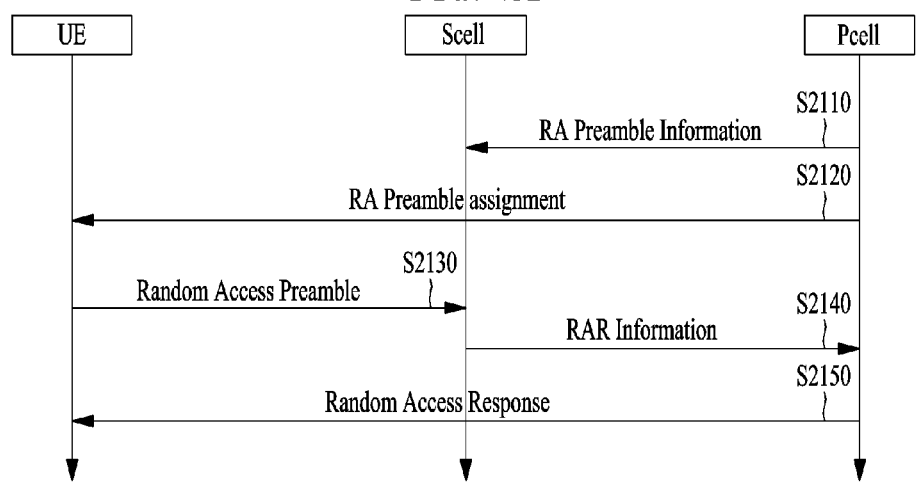
FIG. 21 is a diagram illustrating a method for transmitting DL data according to an embodiment of the present invention.

FIG. 21 is a diagram illustrating a method for transmitting DL data according to an embodiment of the present invention.

In the legacy LTE-A, when the UE transmits a random access preamble to the SCell, the PCell may transmit random access response to the random access preamble. In conventional carrier aggregation, since a PCell and a SCell are configured in the same eNB, the PCell and the SCell may be operated in this form. However, since the PCell and the SCell are positioned in different eNBs, information about a preamble detected by the SCell needs to be transmitted to the PCell. For example, like in FIG. 21, it is necessary to perform random access distinguished from the legacy random access procedure.

The PCell may configure the SCell for the UE using a RRC (re)configuration message. In addition, the PCell may transmit a SCell activation MAC control element to the UE to allow the UE to transmit a UL signal such as a physical random access channel (PRACH), a physical uplink shared channel (PUSCH), and a sounding reference signal (SRS) to the SCell. Then the PCell may determine a specific random access preamble aligned to the UE such that the UE acquires initial UL timing alignment (TA) of sTAG including the SCell.

The PCell may transmit a random access (RA) preamble information message to the SCell in order to notify the SCell of the determined random access preamble (S2110). The RA preamble information message may include at least one of "a message type, an RA preamble index determined to be transmitted to the SCell by the UE, a C-RNTI of the UE to which an RA preamble index is to be transmitted, and/or a timer (a window to be monitored while expecting that the UE transmits a RA preamble)". The RA preamble information message may be transmitted through an X2 interface between the SCell and the PCell.

The SCell that receives the RA preamble information message may detect a RA preamble to be transmitted by the UE in a PRACH resource of the SCell. Prior to a random access procedure, the PCell that exchanges information between the SCell and the PCell may notify the UE of PRACH information of the SCell. The SCell that receives the RA preamble information message may detect an RA preamble received in a PRACH resource of the SCell until a timer included in a message expires.

The PCell may allocate the determined RA preamble to the UE (S2120). The PCell may notify the UE of the RA preamble information through a RRC (re)configuration message, a handover command message, a PDCCH order, or the like. The UE that receives the SCell ID (PCID or ECGI), the SCellindex, and the RA preamble information, which are transmitted from PCell, may recognize that a specific RA preamble is allocated with respect to the SCell, and may transmit the RA preamble allocated to the SCell to the SCell (S2130). As described above, the SCell may detect the RA preamble in a PRACH resource.

The SCell that detects the RA preamble allocated to the UE by the PCell may recognize that the UE identified by the PCell performs random access on the SCell. That is, when the random access performed by the UE identified according to a specific C-RNTI by the PCell is completely performed, the SCell may transmit and receive data to the UE identified by the C-RNTI.

When the SCell detects the RA preamble transmitted by the UE and the detected preamble is the same as a RA preamble index that is pre-transmitted by the PCell, the SCell may transmits a random access response (RAR) information message to the PCell (S2140). The RAR information message may include at least one of "a message type, TA information, a RA-RNTI, a C-RNTI of the UE, and/or a RA preamble identifier detected by the SCell" and may be transmitted through backhaul between the PCell and the SCell. The TA information may be a TA value that is directly acquired by detecting a RA preamble by the SCell and the RA-RNTI may be a value determined by an index associated with a resource of the RA preamble transmitted by the UE. The SCell may transmit a RAR information message to the PCell only when the RA preamble is detected before a timer expires according to timer information pre-received in S2110.

The PCell that receives the RAR information message from the SCell may check whether the RA preamble detected by the SCell is the same as an ID of the RA preamble that is allocated to the UE by the PCell. In the same case, the PCell may transmit a random access response message to the identified UE (S2150).

The random access response message may be transmitted through a physical downlink shared channel (PDSCH), and a PDCCH signaling a PDSCH resource may be transmitted through a search space according to a RA-RNTI. That is, the UE may blind-decode a PDCCH through a search space formed by a RA-RNTI associated with a resource index of the PRACH transmitted by the UE. In this case, upon receiving a PDCCH masked with an RA-RNTI, the UE may receive a random access response message from the PCell through the PDSCH resource signaled by the PDCCH.

The random access response message may include at least one of "a message type, a TA value, a C-RNTI of the UE, and/or an RA preamble identifier detected by the SCell". When the SCell independently allocates a C-RNTI value for the UE separately from the PCell, the PCell needs to additionally notify the UE of the C-RNTI value allocated by the SCell.

Upon receiving a random access response message from the PCell, the UE that transmits the RA preamble to the SCell may check whether an RA preamble identifier transmitted from the SCell is the same as an identifier according to the response message. In the same case, the UE may recognize that the RA preamble transmitted to the SCell is appropriately detected by the SCell and may synchronize with the SCell using the TA value included in the random access response message. In addition, the UE may recognize a C-RNTI value allocated to the UE in the SCell and may blind-decode a PDCCH of the SCell from the C-RNTI value. In addition, when the C-RNTI value allocated by the PCell is the same as the C-RNTI value in the SCell, the UE may detect a PDCCH using the same C-RNTI to perform data communication with the SCell with respect to the SCell.

4. Apparatus Structure

Figure 22:
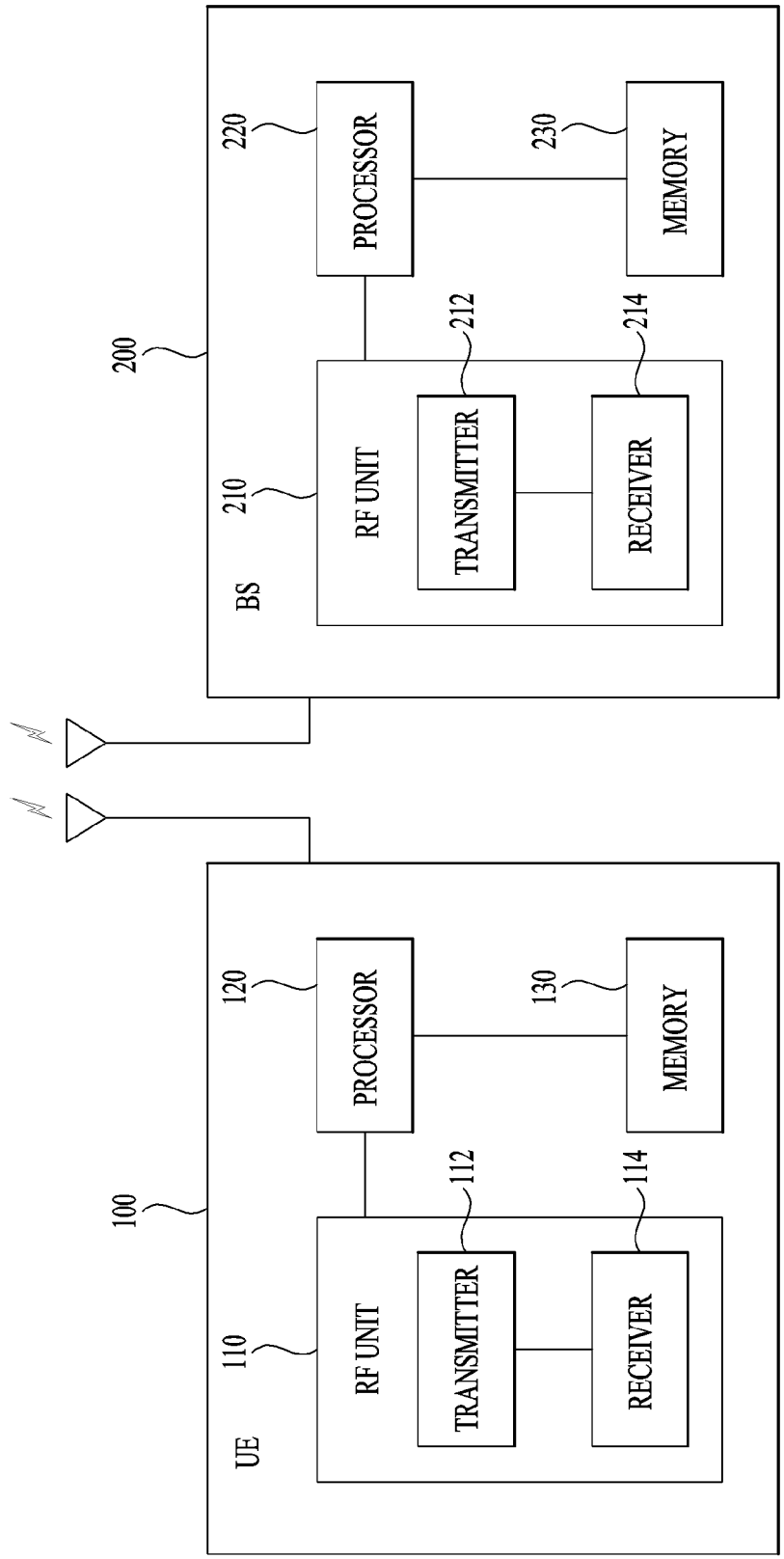
FIG. 22 is a block diagram of a structure of a user equipment (UE) and an eNB according to an embodiment of the present invention.

FIG. 22 is a block diagram of a structure of a UE 100 and an eNB 200 according to an embodiment of the present invention.

In FIG. 22, the UE 100 and the eNB 200 may include radio frequency (RF) units 110 and 210, processors 120 and 220, and memories 130 and 230, respectively. Although FIG. 22 illustrates a 1:1 communication environment between the UE 100 and the eNB 200, a communication environment between a plurality of UEs and the eNB 200 can also be established. In addition, the eNB 200 of FIG. 22 can be applied to both a macro cell eNB and a small cell eNB.

The RF units 110 and 210 may include transmitters 112 and 212 and receivers 114 and 214, respectively. The transmitter and 112 and the receiver 114 of the UE 100 may be configured to transmit and receive signals to and from the eNB 200 and other UEs and the processor 120 may be functionally connected to the transmitter 112 and the receiver 114 to control a process of transmitting and receiving signals to and from other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the eNB 200 may be configured to transmit and receive signals to and from other eNBs and UEs and the processor 220 may be functionally connected to the transmitter 212 and the receiver 214 to control a process of transmitting and receiving signals to and from other devices by the transmitter 212 and the receiver 214. The processor 220 performs various processing processes on signals to be transmitted and then transmits the processed signals to the transmitter 212 and performs processing on the signals received by the receiver 214. As necessary, the processor 220 may store information contained in exchanged message in the memory 230. Based on this structure, the eNB 200 can perform various methods according to the aforementioned embodiments of the present invention.

The processors 120 and 220 of the UE 100 and the eNB 200 requests (e.g., controls, manipulates, manages, etc.) operations of the UE 100 and the eNB 200, respectively. The processors 120 and 220 may be connected to the memories 130 and 230 for storing program codes and data, respectively. The memories 130 and 230 may be connected to the processors 120 and 220 to stores operating system (OS), an application, and general files.

The processors 120 and 220 according to the present invention can also be called a controller, a microcontroller, a microprocessor, a microcomputer, etc. The processors 120 and 220 may be embodied in the form of hardware, firmware, software, or a combination thereof. When an embodiment of the present invention is embodied using hardware, the processors 120 and 220 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention can be applied various mobile communication systems.

The invention claimed is:

1. A method for transmitting a downlink (DL) signal of a user equipment (UE) with dual connectivity by a small cell in a heterogeneous cell deployment in which a macro cell and the small cell coexist, the method comprising:
checking, by the small cell, that the UE performs handover to a second macro cell from a first macro cell;
determining whether the small cell supports dual connectivity of the UE together with the second macro cell, upon the checking that the UE performs the handover;
when an X2 interface with the second macro cell is capable of being formed and dual connectivity of the UE is not capable of being supported, transmitting, by the small cell, a first data forwarding request message for requesting the second macro cell to transmit DL data of the small cell to the UE;
receiving from the second macro cell, by the small cell, a first data forwarding response message for configuring a radio bearer with the second macro cell;
transmitting to the second macro cell, by the small cell, a serial number (SN) status transfer message including information about a count value of a first packet to be transmitted to the UE by the second macro cell; and
transmitting, by the small cell, the DL data to the second macro cell through the radio bearer configured based on the first data forwarding response message.

2. The method according to claim 1, further comprising receiving a target PCell information message indicating that the handover is performed, from the first macro cell,
wherein the handover is checked based on the target PCell information message.

3. The method according to claim 1, further comprising:
when the second macro cell is not capable of transmitting the DL data to the UE, receiving, from the second macro cell, a data forwarding failure message comprising information about a reason why transmission of the DL data is not possible instead of receiving the first data forwarding response message from the second macro cell.

4. The method according to claim 1, further comprising, when the X2 interface with the second macro cell is not capable of being formed, transmitting a second data forwarding request message to the second macro cell through a mobility management entity (MME) that supports the small cell.

5. The method according to claim 4, further comprising:
receiving a second data forwarding response message through the MME from the second macro cell in response to the second data forwarding request message; and
transmitting the DL data to the second macro cell through a radio bearer via a serving gateway (S-GW) that supports the small cell.

6. A small cell base station (BS) for transmitting a downlink (DL) signal of a user equipment (UE) with dual connectivity in a heterogeneous cell deployment in which a macro cell and the small cell coexist, the small cell BS comprising:
a transmitter;
a receiver; and
a processor connected to the transmitter and the receiver, wherein the processor is configured to:
control transmission of a DL signal of the UE,
check that the UE performs handover to a second macro cell from a first macro cell,
determine whether the small cell supports dual connectivity of the UE together with the second macro cell, upon the checking that the UE performs the handover;
when an X2 interface with the second macro cell is capable of being formed and dual connectivity of the UE is not capable of being supported, control the transmitter to transmit a first data forwarding request message for requesting the second macro cell to transmit DL data of the small cell BS to the UE,
control the receiver to receive a first data forwarding response message for configuring a radio bearer with the second macro cell from the second macro cell,
control the transmitter to transmit a serial number (SN) status transfer message including information about a count value of a first packet to be transmitted to the UE by the second macro cell, to the second macro cell, and
control the transmitter to transmit the DL data to the second macro cell through the radio bearer configured based on the first data forwarding response message.

7. The small cell BS according to claim 6, wherein:
the processor controls the receiver to receive a target primary cell (PCell) information message indicating that the handover is performed, from the first macro cell, wherein the handover is checked based on the target PCell information message.

8. The small cell BS according to claim 6, wherein, when the second macro cell is not capable of transmitting the DL data to the UE, the processor controls the receiver to receive, from the second macro cell, a data forwarding failure message comprising information about a reason why transmission of the DL is not possible instead of receiving the first data forwarding response message from the second macro cell.

9. The small cell BS according to claim 6, wherein, when the X2 interface with the second macro cell is not capable of being formed, the processor controls the transmitter to transmit a second data forwarding request message to the second macro cell through a mobility management entity (MME) that supports the small cell BS.

10. The small cell BS according to claim 9, wherein the processor controls the receiver to receive a second data forwarding response message through the MME from the second macro cell in response to the second data forwarding request message and controls the transmitter to transmit the DL data to the second macro cell through a radio bearer via a serving gateway (S-GW) that supports the small cell BS.

* * * * *